(12) United States Patent
Brown

(10) Patent No.: US 9,937,873 B2
(45) Date of Patent: Apr. 10, 2018

(54) SYSTEM, ENCLOSURE AND METHOD FOR DEPLOYMENT OF AUDIO VISUAL EQUIPMENT FROM A VEHICLE AS A BASE

(71) Applicant: Joel Brown, Knoxville, TN (US)

(72) Inventor: Joel Brown, Knoxville, TN (US)

( * ) Notice: Subject to any disclaimer, the term of this patent is extended or adjusted under 35 U.S.C. 154(b) by 70 days.

(21) Appl. No.: 14/839,300

(22) Filed: Aug. 28, 2015

(65) Prior Publication Data

US 2016/0059794 A1   Mar. 3, 2016

Related U.S. Application Data

(60) Provisional application No. 62/043,778, filed on Aug. 29, 2014.

(51) Int. Cl.
*B60R 11/00* (2006.01)
*B60R 11/02* (2006.01)

(52) U.S. Cl.
CPC ...... *B60R 11/0217* (2013.01); *B60R 11/0235* (2013.01); *B60R 2011/004* (2013.01); *B60R 2011/0094* (2013.01); *B60R 2011/0096* (2013.01)

(58) Field of Classification Search
CPC .......... B60R 11/0217; B60R 11/0235; B60R 2011/004; B60R 2011/0094; B60R 2011/0096
USPC ......... 381/386, 387, 389, 390; 224/403, 404
See application file for complete search history.

(56) References Cited

U.S. PATENT DOCUMENTS

| | | | | |
|---|---|---|---|---|
| 5,321,760 A * | 6/1994 | Gray | ................... | B60R 11/0217 181/150 |
| 6,243,260 B1 | 6/2001 | Lundgren et al. | | |
| 6,292,573 B1 | 9/2001 | Zurek et al. | | |
| 6,343,135 B1 * | 1/2002 | Ellero | ................... | H04R 1/025 181/199 |
| 6,474,521 B1 * | 11/2002 | Young | ..................... | B60R 9/00 198/710 |
| 6,608,909 B2 * | 8/2003 | Brady | ................... | A61H 33/60 211/172 |
| 6,814,383 B2 * | 11/2004 | Reed, III | .................. | B60P 3/14 224/404 |
| 7,077,236 B2 * | 7/2006 | Sleboda | ................. | H04R 1/025 181/150 |
| 7,080,816 B1 * | 7/2006 | Vaccaro | ................. | F16M 11/28 248/530 |
| 7,164,576 B2 * | 1/2007 | Suprapmo | ............ | G06F 1/1605 248/918 |

(Continued)

FOREIGN PATENT DOCUMENTS

CN       201718012 U       1/2011
WO      2004064369 A2     7/2004

*Primary Examiner* — Peter Helvey
(74) *Attorney, Agent, or Firm* — Oliff PLC

(57) ABSTRACT

A system for deployment of audio and/or visual components from a vehicle as a base, the system comprising a housing configured to be held during transport in the vehicle, a movable lid attached to the housing, one or more arms attached to the housing and configured: (i) to be enclosed within the housing when the lid is closed, and (ii) to mechanically deploy to a position outside of the housing by moving out of the housing when the lid is open. The system may further include one or more speakers mounted on or embedded within the one or more arms, and a processor configured to automatically: (i) open the lid, and (ii) mechanically deploy the one or more arms.

20 Claims, 27 Drawing Sheets

(56) References Cited

U.S. PATENT DOCUMENTS

| | | | |
|---|---|---|---|
| 7,242,785 B2 | 7/2007 | McNary | |
| 7,469,052 B2 | 12/2008 | Peavey | |
| 7,814,583 B2 * | 10/2010 | Lerma | A47K 3/001 |
| | | | 381/334 |
| 8,281,967 B2 * | 10/2012 | Evans | B60R 9/00 |
| | | | 224/404 |
| 8,526,661 B2 * | 9/2013 | Newberg | H04R 1/025 |
| | | | 248/27.1 |
| 8,931,670 B2 * | 1/2015 | Fakhari | B60P 3/14 |
| | | | 224/402 |
| 8,948,437 B2 * | 2/2015 | Paye | H04R 1/02 |
| | | | 381/386 |
| 2003/0197043 A1 * | 10/2003 | Thomson | B60P 3/341 |
| | | | 224/404 |
| 2007/0080264 A1 * | 4/2007 | Kukucka | B60R 11/0217 |
| | | | 248/27.1 |
| 2008/0141924 A1 * | 6/2008 | Adams | B63B 35/85 |
| | | | 114/343 |
| 2008/0308591 A1 * | 12/2008 | Henderson | B60R 5/00 |
| | | | 224/404 |
| 2009/0052712 A1 | 2/2009 | Trelohan | |
| 2009/0121508 A1 * | 5/2009 | Balcerzak | B60R 11/0223 |
| | | | 296/1.08 |
| 2010/0264180 A1 * | 10/2010 | Allotey | B60R 9/00 |
| | | | 224/404 |
| 2013/0279090 A1 | 10/2013 | Brandt | |
| 2013/0329936 A1 | 12/2013 | Tseng et al. | |
| 2014/0054339 A1 * | 2/2014 | Smith | B60R 9/06 |
| | | | 224/404 |

* cited by examiner

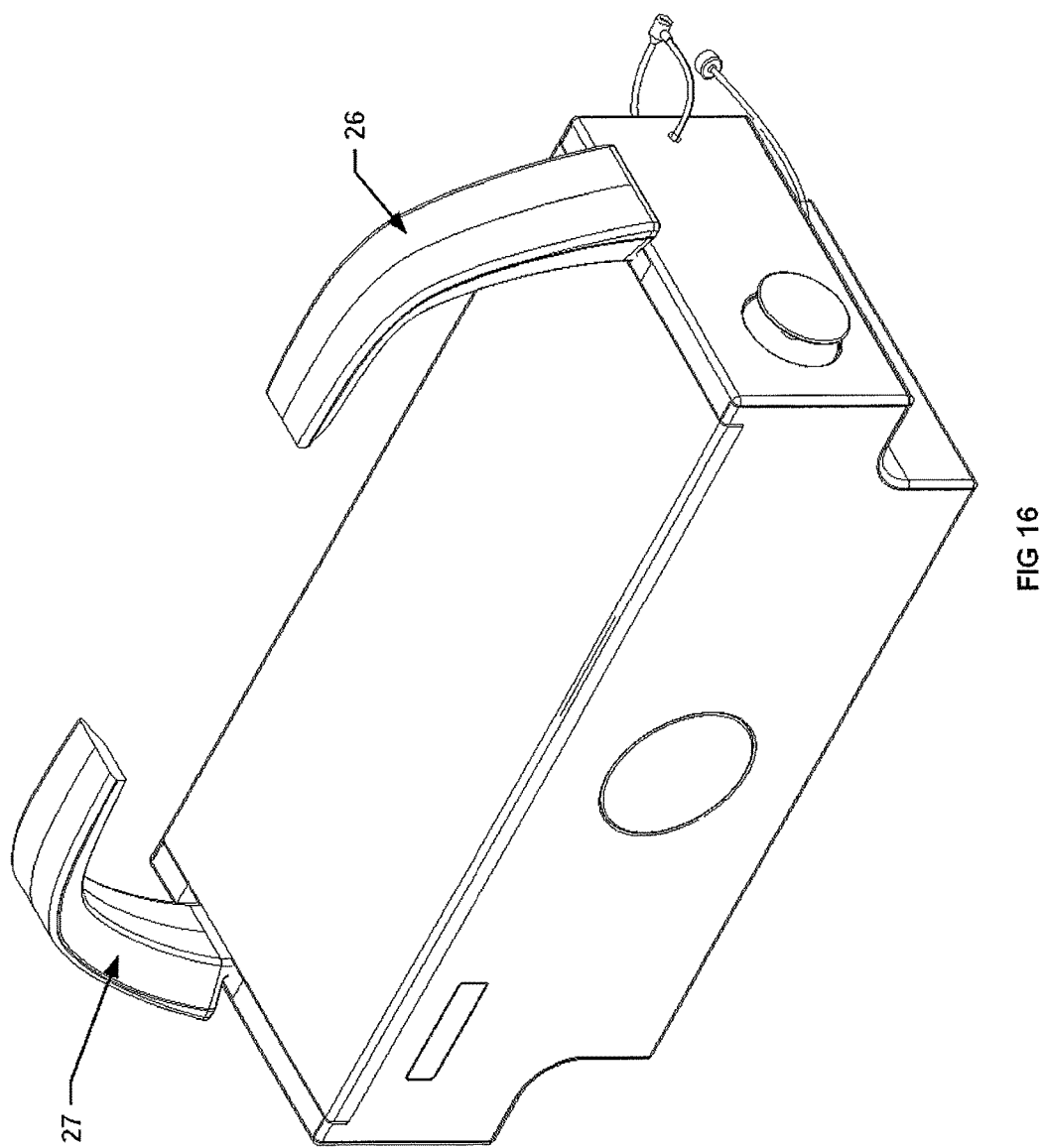

Control Panel 6

SYSTEM, ENCLOSURE AND METHOD FOR DEPLOYMENT OF AUDIO VISUAL EQUIPMENT FROM A VEHICLE AS A BASE

PRIORITY TO PROVISIONAL APPLICATION

This application claims the benefit of priority of U.S. Provisional Patent Application No. 62/043,778, filed Aug. 29, 2014.

BACKGROUND

Technical Field

The present disclosure relates to audio visual equipment, enclosures and methods for deployment of audio visual equipment from a vehicle (e.g., car, truck) as a base. In particular, the disclosure provides an audio visual system and method for deploying audio visual equipment from a vehicle as a base, and an enclosure for housing and for deployment of the audio visual components used in the system and method. In particular, the system, enclosure and method allow for rapid, secure and stabilized transport and seamless deployment of audio visual equipment for outdoor use. For example, deployed audio visual equipment may be used in an outdoor environment, such as tailgating events or public broadcast/notification events (e.g., giant voice), such as, by government agencies (e.g., emergency response, law enforcement, other security or safety related vehicle, etc.).

Related Art

Audio visual systems are generally known. In particular, as shown in WO 2004/064369, systems have been developed for providing audio visual components within a home environment. Further, U.S. Patent Publication No. 2013/0279090 (Brandt) discloses a self-contained deployable digital signage display with stand adapted for utilization as transportation containers (for shipping) that allow for a flat screen video display to be erected in retail space.

U.S. Pat. No. 7,469,052 (Peavey) discloses a portable sound case with speakers and an openable lid permitting access to sound equipment, which is used for public speaking with microphone and amplifiers, etc.

U.S. Patent Publication No. 2013/0329936 (Tseng) discloses an array speaker structure with pop-up mechanisms that can be bounced out under elastic restoring force, then rotated to a front side of an audio/video device, whereby the speakers can emit sound from the front side of the audio/video device. Tseng discloses tablet personal computers (PCs or laptops) that, while convenient to carry, employ small-power speakers.

U.S. Patent Publication No. 2009/0052712 (Trelohan) discloses a deployable retractable projection screen (moved in a vertical direction) for use in rooms where the ceiling is too high to install a projection screen.

However, conventional systems are silent regarding deployment of audio visual equipment from an enclosable housing, which is configured to stabilize in and/or be secured to a vehicle as a base for the deployment. Brandt fails to discuss audio, let alone deployment and configuration for stable and secure transport in a vehicle. Peavey does not provide for consideration of visual displays, nor a method for enclosing both audio and/or visual components which can be secured to and operated from a vehicle. Tseng is silent regarding a secure, stabilized enclosure for audio beyond personal computers (PCs), laptops, and audio/visual devices nor a method for enclosing both audio and/or visual components, which can be secured to and operate from a vehicle and deployed in an outdoor environment from a vehicle as a base. Trelohan is silent regarding deployment of both audio and/or visual components which can be deployed from and secured in an enclosure configured to be held in a moving vehicle. Moreover, if any of the above described conventional systems were to be placed in a vehicle to use as a base for deployment (e.g., in a truck bed as a base), the conventional systems have no means to secure or stabilize the systems for transport in the vehicle. In other words, conventional systems are likely to substantially shift (which could cause damage) and/or be ejected from the vehicle during transport.

In other words, conventional audio visual systems where the intended environment is a home or office, do not provide an audio visual system, method and enclosure (e.g., housing and lid) that encloses audio visual components (e.g., speakers, LED lights, monitors) while providing: (1) portability of the audio visual system (e.g., able to be transported in a common vehicle, such as, a pickup truck), (2) protection from sunlight and weather (e.g., rain, hail, snow), and (3) automated deployment of audio visual equipment. Further, the conventional audio visual systems where a home or office is the intended environment do not provide security mechanisms to securely lock audio visual equipment within an enclosure, and to a vehicle.

One or more aspects of the present disclosure provide an audio visual system including an enclosure (for housing audio visual components or equipment), which may be moved to a vehicle, placed inside or attached to the vehicle and may provide protection from weather and theft. The enclosure also may include a housing and lid to enclose the audio and/or visual components in the housing. The lid and/or housing may each include security mechanisms to protect from theft. The housing may also include motorized deployable (mounting) arms configured to, preferably, provide mountable attachments for speakers. The arms may be controlled by a control panel to open (deploy) and close (retract), for example, based on user input (e.g., a button/switch and/or a remote device (e.g., smartphone)).

BRIEF DESCRIPTION OF THE DRAWINGS

Exemplary embodiments will be described with reference to the following drawings.

FIG. 16 shows a right front perspective view of the embodiment of FIG. 12 including arms.

DETAILED DESCRIPTION OF EXEMPLARY EMBODIMENTS

Figure 1:
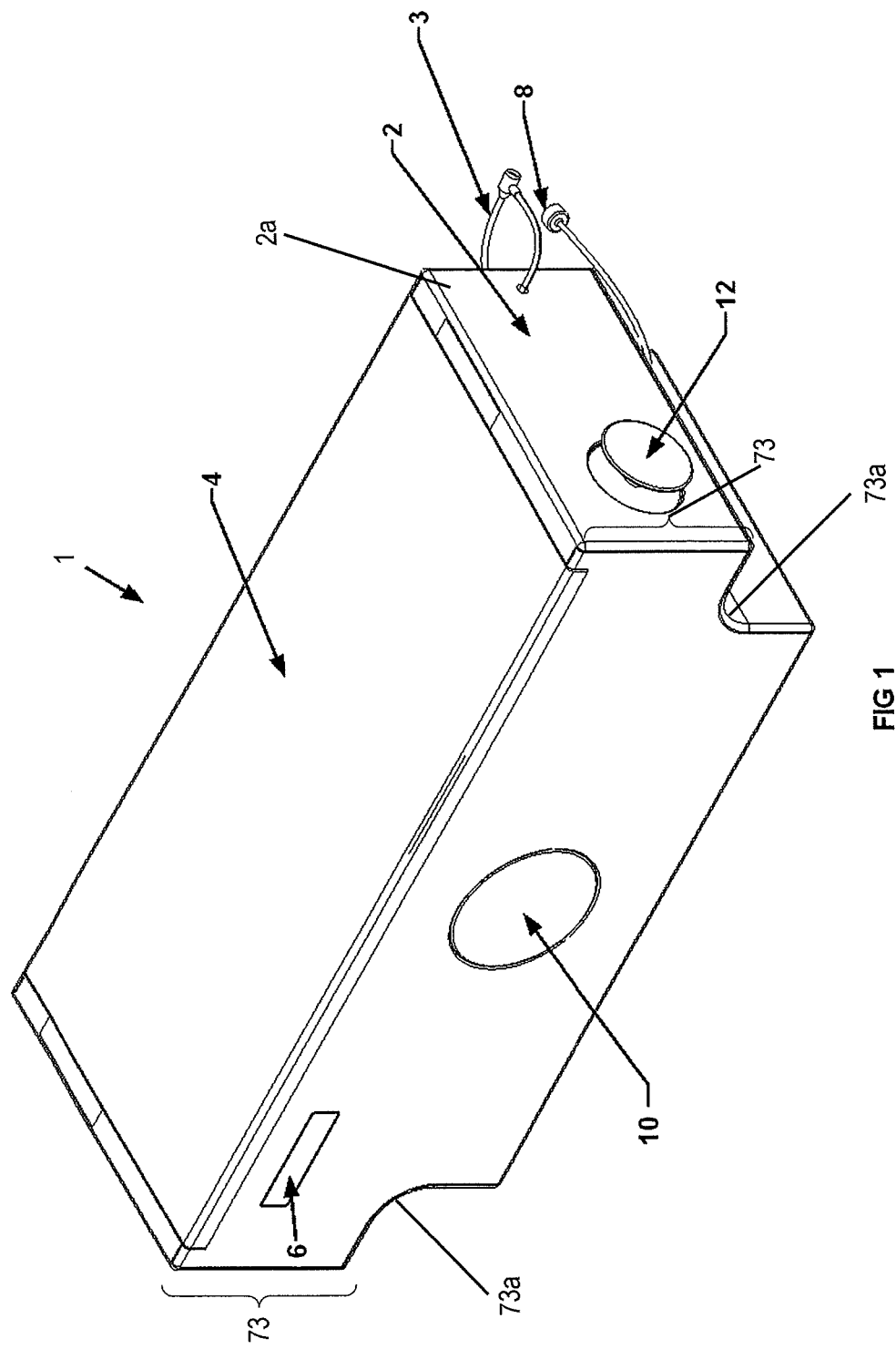
FIG. 1 shows a right front perspective view of a first embodiment of an audio visual system with an enclosure including a housing and a closed lid.

FIG. 1 shows the enclosure 1 according to an exemplary embodiment of the present disclosure. Enclosure 1 may include a housing 2 and a lid 4, which is shown as closed here. The housing 2 and/or lid 4 may be constructed of and supported by a frame 20 (illustrated in FIG. 3). The housing may comprise a power supply. For example, as shown in FIG. 1, the housing 2 may comprise: a power supply cord 8, and a speaker opening 10. Preferably, the enclosure includes a stabilizing structure. For example, the enclosure 1 may include one or more stabilizer plates 12 (described in more detail below in reference to FIGS. 21 and 22) configured to recess into the housing 2. The stabilizer plates are used to apply pressure to the inner walls of a vehicle (e.g., the inner walls of a truck bed).

However, stabilizer plates may be unnecessary due to the weight of the enclosure. In other words, in some embodiments, the weight of the enclosure itself (e.g., an all-aluminum enclosure and frame) acts to stabilize the enclosure within the vehicle. Using the stabilizing plates may be a cost add-on, but would improve vehicle fuel efficiency (by lessening the payload weight of the vehicle as compared with having the weight of the enclosure act as a stabilizing force). FIG. 1 shows an embodiment where the housing 2 further comprises a control panel 6 (see FIG. 25 for further detail) shown as provided on the outer surface of the housing 2. The control panel 6 may be located anywhere on the inner or outer surfaces of the housing 2 (e.g., near the left front side, the center, or any other locations on the inner or outer surfaces of the housing 2) or on the outer or inner surfaces of the lid 4. The control panel 6 may comprise a cover, which may lock and unlock via a wired or wireless user input device (e.g., a key, keypad, or other mechanism for locking/unlocking). The control panel may include a marine grade audio receiver, a bank of rocker switches, a battery charge level indicator, ports for a microphone (e.g., a public announcement/mass notification system), USB drive, memory (RAM/ROM), and or one or more processors. For example, a smart device (e.g., iPhone) may sync via Bluetooth to the receiver (which provides signals/operates the audio systems as in cars, boats, etc). The housing 2 may also provide a locking structure, such as, a security cable 3. The security cable 3 in FIG. 1 is capable of securely locking the housing 2 to the vehicle (e.g., a front corner tie-down eye of a standard truck bed (vehicle)). In another embodiment, the locking structure for securely attaching the housing 2 to the vehicle is by attaching (e.g., using threaded bolts, etc.) the bottom of housing 2 to the bed of the truck. This embodiment is a more permanent (not easily removable) locking structure, which also acts to stabilize the enclosure within the vehicle.

Further, the housing 2 may be configured to be installed for subsequent transport in a vehicle (e.g., a truck bed), and for deployment of audio visual equipment from the vehicle as a base. The housing 2 may be configured (and weighted) such that one or more individuals may lift and place the housing 2 into the forward part of a truck bed. Alternatively, the housing 2 may also be set into the rear of the truck bed and slid forward. In this embodiment, the housing sides preferably are configured to include protruding housing portions 73 and concave arc-like portions 73a (to allow the housing 2 to clear specific (e.g., certain truck make/model) or general truck bed wheel wells). In other embodiments, the housing 2 and/or protruding housing portions 73a and corresponding concave arc-like portions 73a may have alternative shapes or may be omitted (e.g., if the vehicle does not require wheel well clearance or, for example, if the housing 2 is to be used in a boat, RV, bus, or other type of vehicle).

The power supply may comprise an electrical receptacle (e.g., to plug in an electrical extension cord to charge batteries used as a power supply) or power cord 8. If the vehicle is equipped with an electrical receptacle or a local electrical receptacle is nearby, then the power supply may be a power cord 8 that is plugged into that receptacle. The power cord 8 may provide initial power to the system and may charge one or more batteries, such as, a deep-cycle marine type sealed re-chargeable battery, which may be housed in a front compartment 14 of the housing 2 (see FIG. 2). The one or more batteries may serve as the power supply to act as a main power source for the audio-visual components/equipment, control panel, motors, linear actuators and other equipment (particularly when no electrical power receptacle is available).

The deployable mounting arms 26 and 27 (see FIGS. 2 and 4-19) may be constructed of carbon fiber, plastic, fiberglass, aluminum, metal, alloys, steel, or other composite materials that are capable of being configured to provide support (e.g., attachment portions) for audio visual components (e.g., large water proof speakers). The mounting arms 26 and 27 may be hollow and may provide a pathway for speaker cables and other wiring to the housing 2. In some embodiments, (e.g., if using Bluetooth-enabled speakers) it may not be necessary to have hollow arms 26 and 27. In other embodiments, the audio visual equipment (e.g., speakers) may be enabled to allow for direct wireless communication with the control panel 6, such that the control panel 6 may directly transmit/send data to the speakers or other components (e.g., a monitor), such as by wired or wireless communication (e.g., Bluetooth). Thus, it may not be necessary for the mounting arms to be hollow. In other embodiments, a user device (such as a smartphone) may be used, instead of or in addition to the control panel 6, to send data to the speakers or other components directly by wired or wireless communication.

Figure 2:
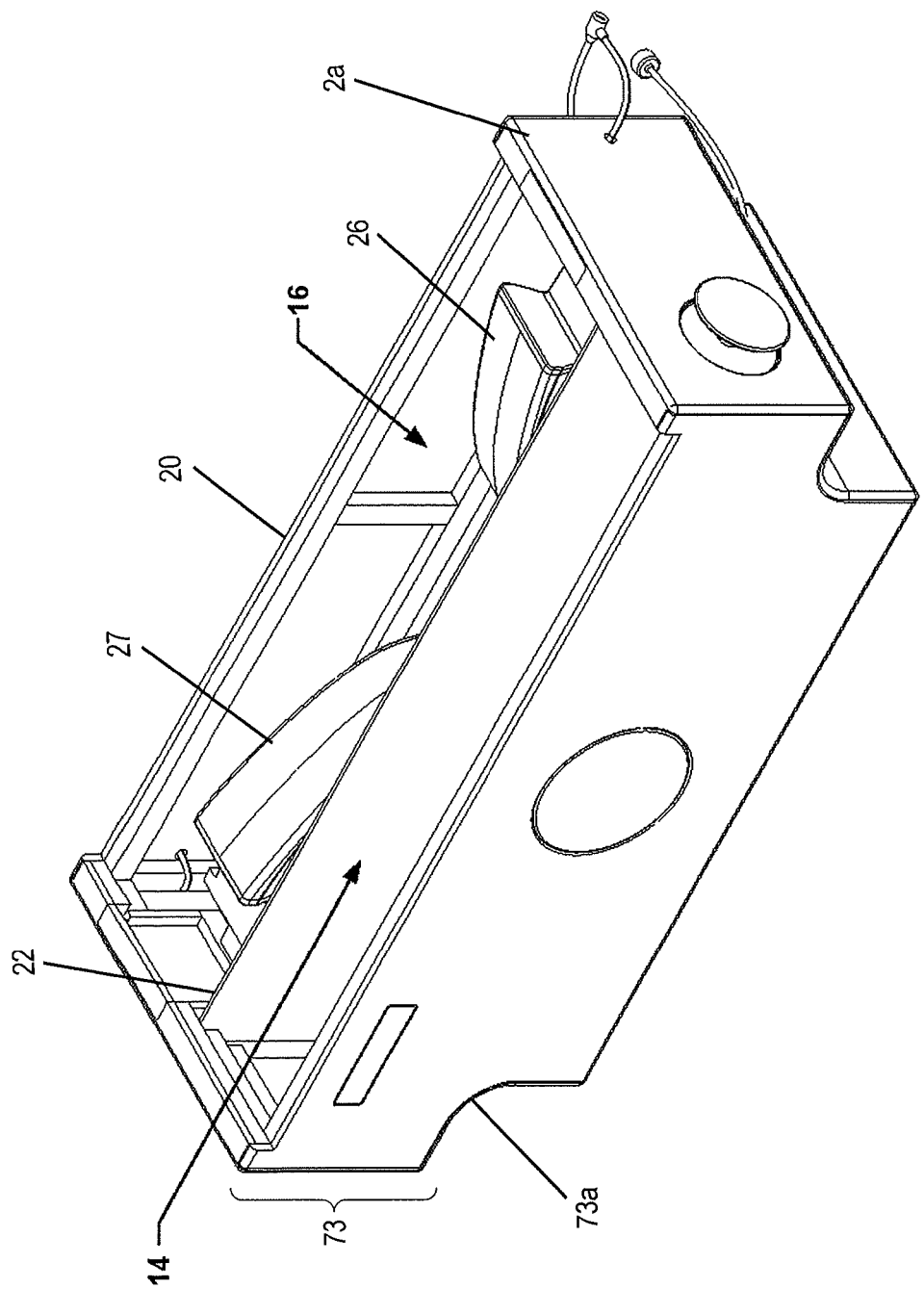
FIG. 2 shows a right front perspective view of the FIG. 1 embodiment of the audio visual system with the lid removed.

FIG. 2 shows the FIG. 1 embodiment when the lid 4 is removed. In particular, as shown in FIG. 2, the housing 2 may be partitioned into two large compartments, such as a front compartment 14 and a rear compartment 16. Front compartment 14 may house electrical and/or mechanical components including but not limited to: amplifiers, capacitors, breakers, power supplies, batteries, drive motors, gears, control panel, LED modules, relays, wiring harnesses, cooling fans, exhaust fans, LED light controls, DVRs, transceivers, satellite receivers, microphones, pulleys, cables, springs, and/or other components.

Figure 3:
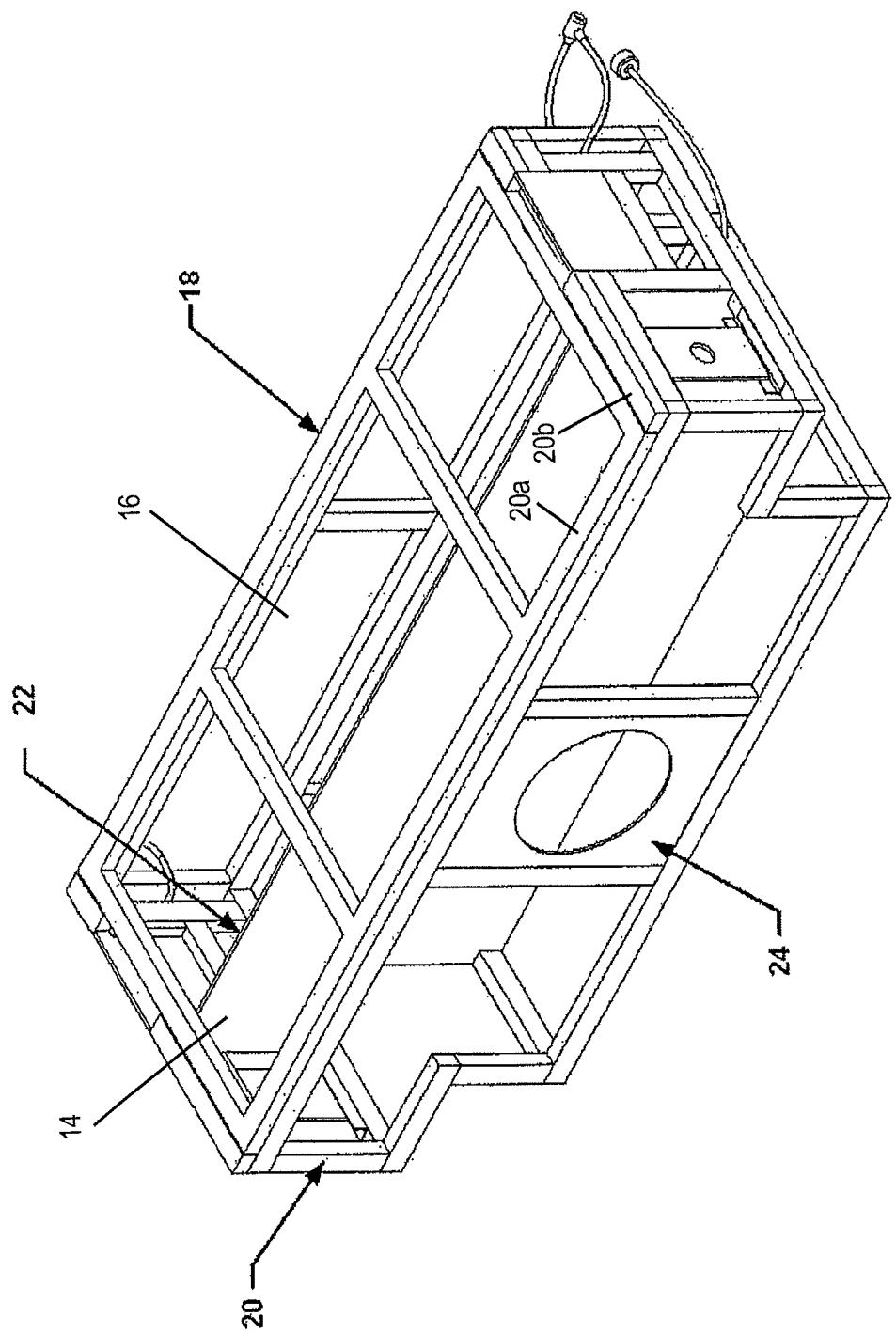
FIG. 3 shows a right front perspective view of a housing frame and lid frame of the enclosure of FIG. 1.

FIG. 3 shows an example of a lid frame. For example, lid frame 18 in FIG. 3 is configured to provide an upper portion to allow the lid to rest. For example, the upper portion may be an upper inside ledge 20a of the housing frame 20. In FIG. 3, the inside ledge 20a is at a distance lower than other upper portions 20b of the frame 20, the distance being identical or approximately the same as a depth of the lid. In this embodiment, the lid (when closed) would be flush with the other upper portions 20b of the frame 20. However, in other embodiments, the lid frame 18 may rest on top of the housing frame 20 or may be positioned in other manners (e.g., other manners enclosing the front and rear compartments 14, 16).

The housing may further have one or more mounting plates 24. FIG. 3 illustrates a mounting plate 24 configured for mounting a sub-woofer. In alternate embodiments, the speaker (e.g., sub-woofer) may be installed without an opening in the housing 2. The frames 18 and 20 may be constructed of aluminum, carbon fiber, fiberglass, alloys, steel, plastic or other composite materials that are capable of supporting the housing 2 and the lid 4. The outside of the frames 18 and 20 may have panels mounted by bolting, welding, and/or other methods for adhering panels to frame 20. The housing and lid may be constructed with a sufficiently hard weatherproofed material that is capable of preventing breaches by would be thieves. For example, the housing and lid may be constructed of aluminum, but other materials may be used including carbon fiber, fiberglass, alloys, steel, plastic, metal and/or other materials (e.g., other composite materials that provide protection from theft and/or weather). On the interior of the housing, insulation may be added to help protect the equipment from effects of high temperatures. The housing 2 may also provide louvers on outer side panels 2a and/or other outside surfaces of the housing for facilitating airflow of the housing 2, such as in the front or rear compartments 14, 16, and in the interior mounting wall 22 to allow for airflow. A fan may be installed in the housing 2 to facilitate airflow and remove heat from the housed equipment. For example, an exhaust fan (and/or cooling fan) may be installed in the front and/or rear compartments 14, 16.

FIG. 3 further illustrates an embodiment of the housing 2, which contains an interior mounting divider or wall 22, which may separate or partition compartments of the housing 2. For example, interior mounting wall 22 may be an aluminum sheet with a thickness in the range of ~⅓ inch to ~⅛ inch. ⅛ inch is a sufficient thickness for the aluminum sheet 22. The aluminum sheet 22 may be welded to the interior of the housing frame 20, which, can subsequently be used for mounting (e.g., be drilled/tapped and threaded or bolted to). The interior mounting wall 22 may be constructed of aluminum, but other materials including carbon fiber, fiberglass, alloys, steel, plastic and/or other materials may be used. Audio visual components or equipment may be housed in the front compartment 14 and mounted to (e.g., by bolts, welded, riveted, or attached and secured by other means) to either the frames 18 or 20, the panels 2a, and/or the interior mounting wall 22. There may be one or more interior mounting walls. The rear compartment 16 may in some embodiments house the deployable mounting arms, attached speakers, one or more flat screen monitors, one or more cameras, one or more satellite receivers, one or more led lights, and/or other equipment. In other embodiments, there could be additional interior mounting walls for additional separate internal compartments (e.g., for LCD monitors (see FIG. 23), and/or other electronic or mechanical equipment).

Figure 4:
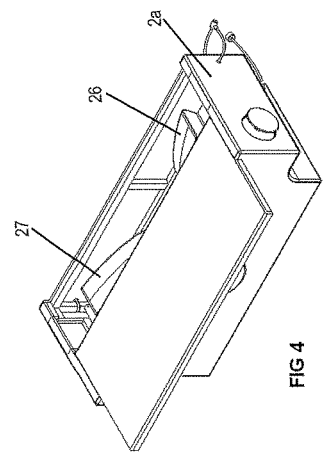
FIG. 4 shows a right front perspective view of the enclosure of FIG. 1 with a lid that is fully opened and arms that are fully retracted.
Figure 7:
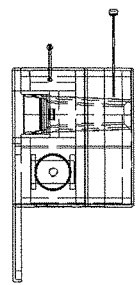
FIG. 7 shows a right side cut-away view of the embodiment of FIG. 4.
Figure 5:
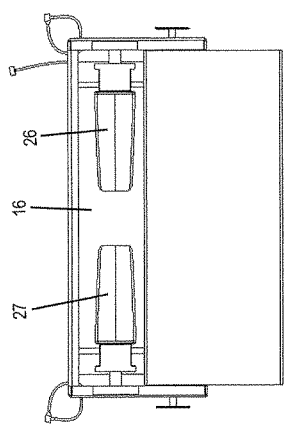
FIG. 5 shows a top view of the embodiment of FIG. 4.
Figure 6:
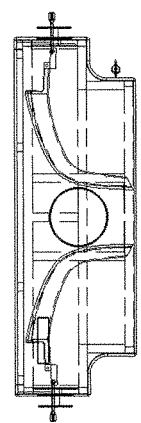
FIG. 6 shows a front cut-away view of the embodiment of FIG. 4.

FIG. 4 shows a right front perspective view of the embodiment of FIG. 1 with a lid that is fully opened and arms that are fully retracted. Fully opened in this embodiment means that the lid covers only the front compartment 14. In other embodiments, the lid may be fully opened, where fully opened includes opening the lid even further (or not as far). FIG. 4 further illustrates that the lid 4 may be mounted and provided with a mechanism that allows the lid 4 to open and close, such as a mechanism (for example, rails and bearings or tracks) that enables the lid to open by a sliding lateral motion. In other embodiments, the mechanism that enables the lid to open may be hinges or other mechanisms for opening the lid. FIG. 4 shows deployable motorized mounting arms 26 and 27 in a pre-arm-deployment state such that the arms may be enclosed by the housing when the lid is closed. FIGS. 5-7 show a top, front and right side view of the embodiment (system/enclosure) of FIG. 4, respectively.

Figure 8:
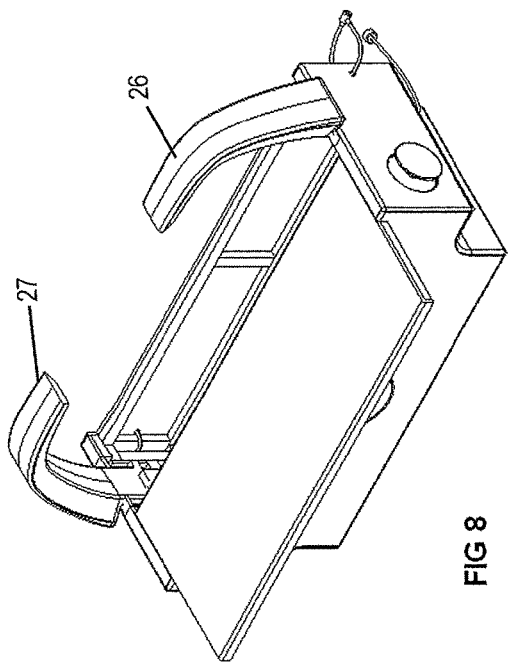
FIG. 8 shows a right front perspective view of the enclosure with fully deployed (motorized) mounting arms.
Figure 33:
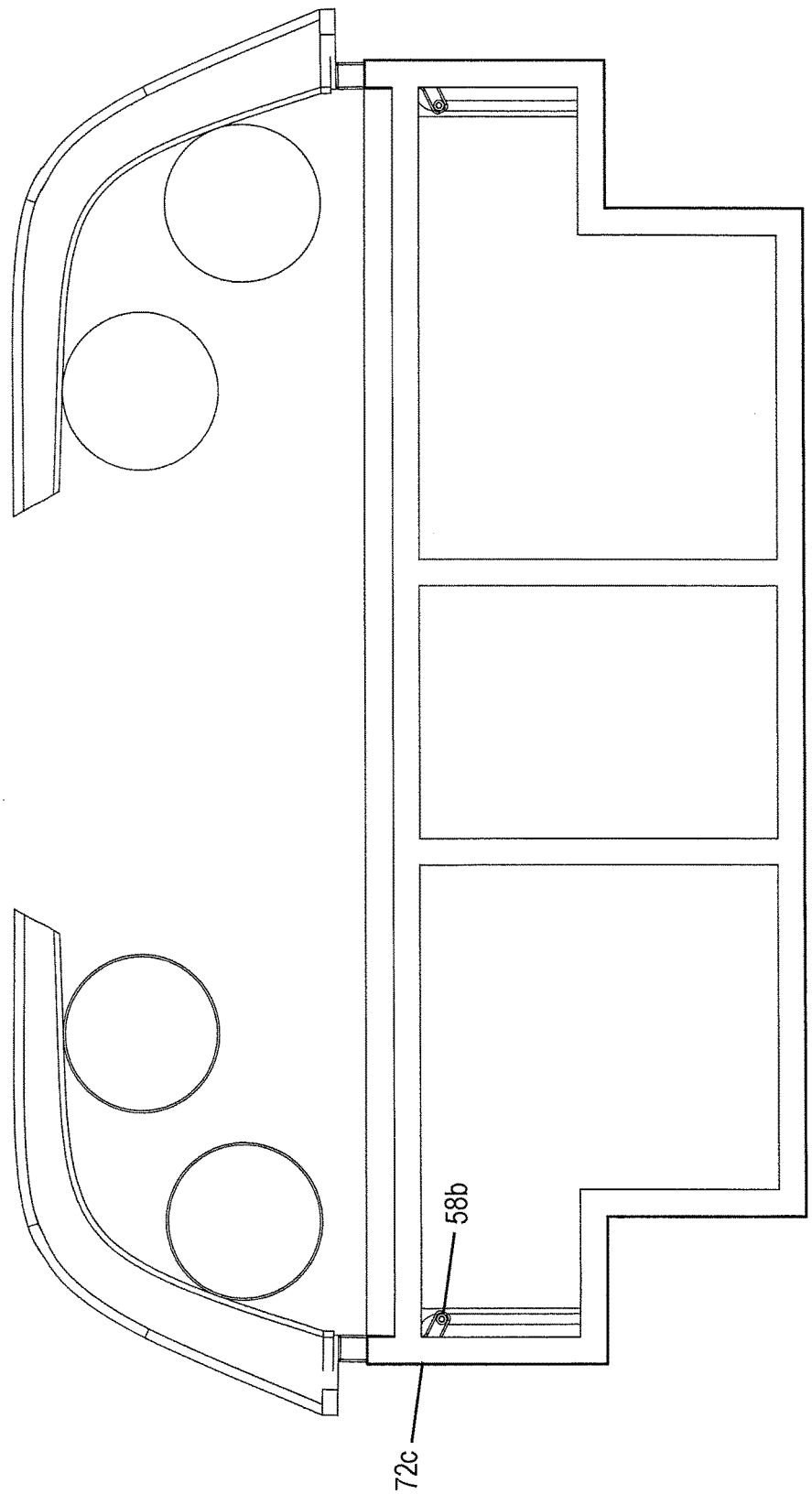
FIG. 33 shows a front cut-away view of the enclosure of FIG. 31 with the mounting arms in a second state of arm deployment (arms fully deployed).

FIG. 8 shows a right front perspective view of the same FIGS. 5-7 embodiment/enclosure with a fully opened lid, but now with motorized mounting arms 26 and 27 that are deployed/fully extended (e.g., in the second (full state) of arm deployment shown in, for example, FIG. 33). Specifically, FIG. 8 illustrates that in this embodiment, when the lid 4 is open, both the right mounting arm 26 and the left mounting arm 27 may be deployed. In this embodiment, the base of the mounting arms 26 and 27 may have an attached deployment and/or retraction mechanism. For example, the attached deployment and/or retraction mechanism may be configured to be attached to a bottom portion of the housing, and, when an electronic signal is received (e.g., see PLC code discussed below), deploy (raise) deployable mounting arms 26 and 27 into one or more deployment states. The deployment and/or retraction mechanism may comprise cam rollers mounted in a bracket assembly.

Figure 11:
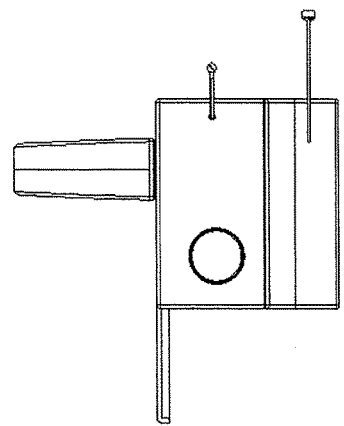
FIG. 11 shows a right side view of the embodiment of FIG. 8.
Figure 9:
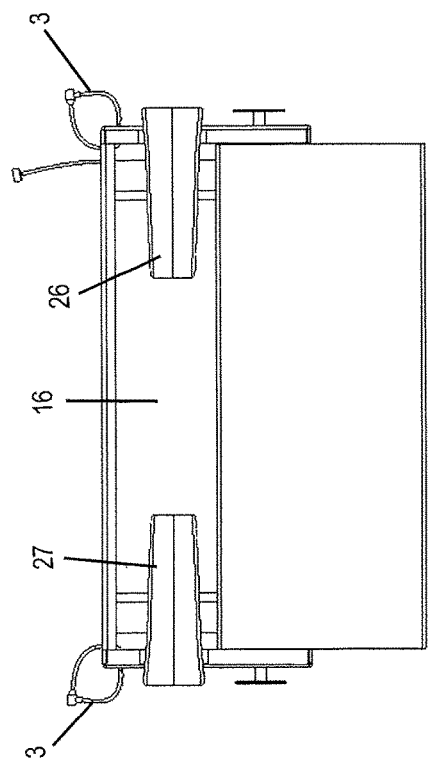
FIG. 9 shows a top view of the embodiment of FIG. 8.
Figure 10:
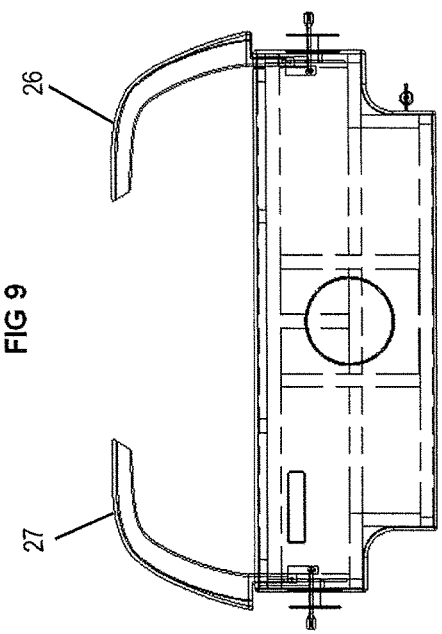
FIG. 10 shows a front cut-away view of the embodiment of FIG. 8.
Figure 24:
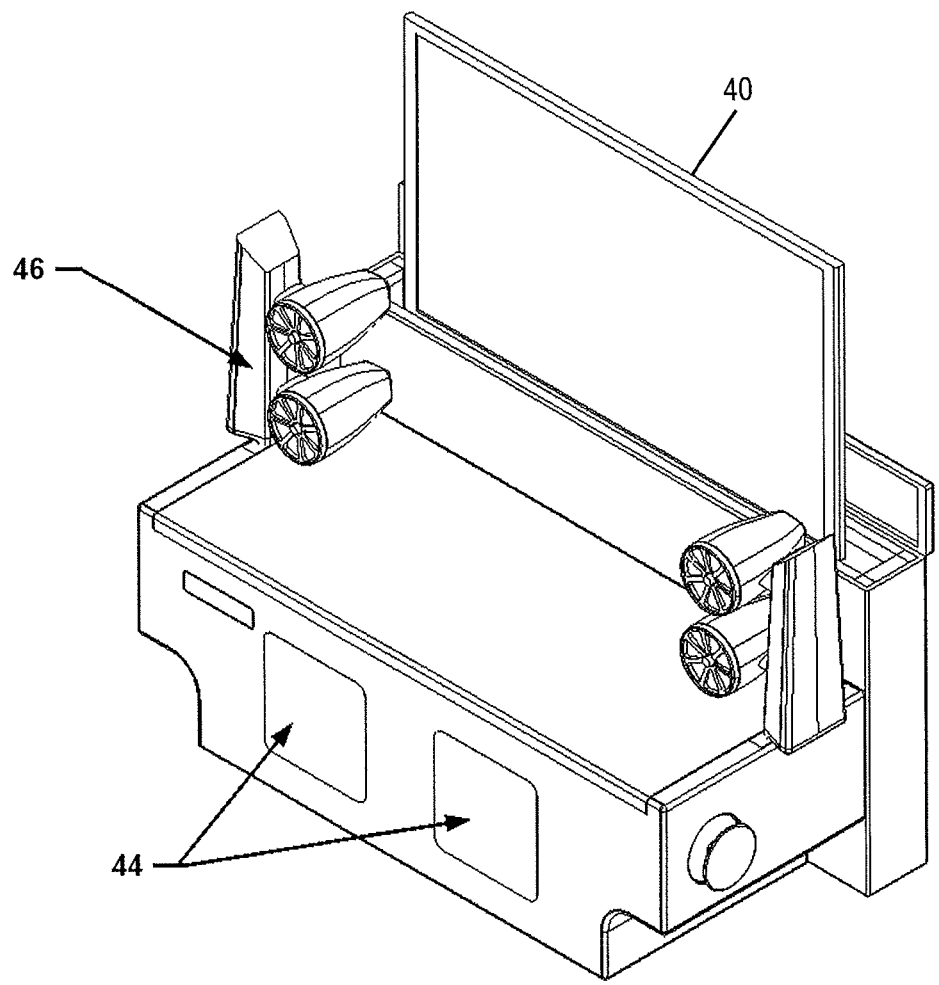
FIG. 24 shows the right front perspective of the embodiment of FIG. 23, further including vertical mounting arms and two openings for sub-woofer speakers.

FIG. 8 also shows that each of the mounting arms 26 and 27 may be configured in a curved shape. The curved shape may mimic the contour of a pickup truck cab behind which the arms are to be deployed. However, the arms may be configured in other shapes. For example, it may be advantageous to have the mounting arms in an obtuse angled configuration, curved shape or extend vertically. For example, as shown in FIG. 24, the vertical mounting arms 46 allow unobstructed viewing of a monitor 40 (e.g., a small-screen (e.g., 32") or large-screen flat panel monitor (as shown)). The size of the flat screen television or computer monitor may be as wide or wider than the truck or smaller to allow for use with the curved arms. FIGS. 9-11 show respective top, front, right side, and right front view of the embodiment of the enclosure/system of FIG. 8.

Figure 12:
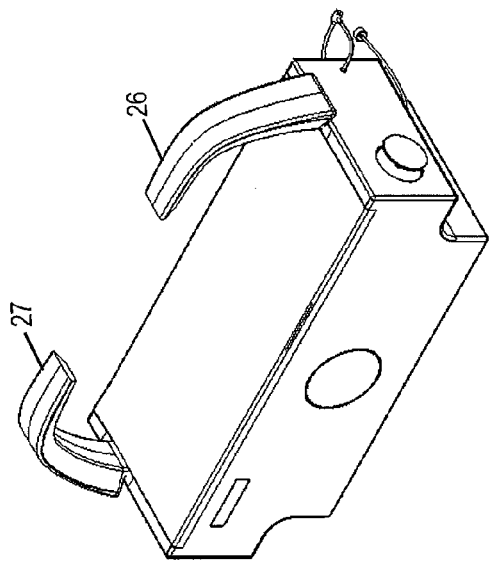
FIG. 12 shows a right front perspective view of the embodiment of FIG. 8 with the lid closed and with the arms deployed/fully extended.
Figure 15:
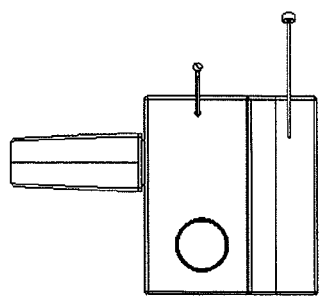
FIG. 15 shows a right side view of the embodiment of FIG. 12.
Figure 13:
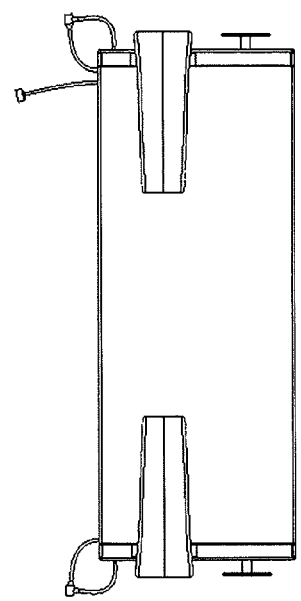
FIG. 13 shows a top view of the embodiment of FIG. 12
Figure 14:
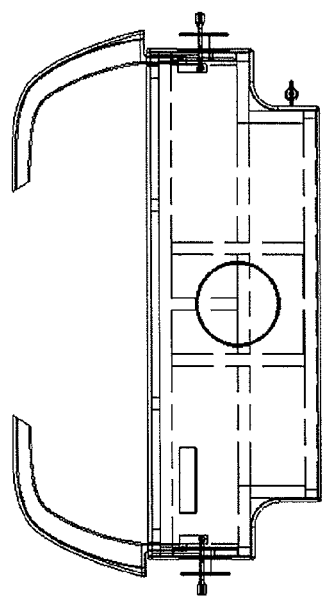
FIG. 14 shows a front cut-away view of the embodiment of FIG. 12.

FIGS. 12 and 16 (enlarged view) show a right front perspective view of the enclosure with a lid, which is now closed and arms 26, 27 that are deployed/fully extended. In this embodiment, the arms 26, 27, which may be configured to have speakers attached (see FIGS. 17-19, 27, 29 and 31-34), may be partially extended (first state of arm deployment see FIG. 31) or fully extended (second state of arm deployment) while still providing protection from weather or theft of the audio visual equipment enclosed by the housing 2 and lid 4. FIGS. 13-15 show top, front, right side views of the embodiment of the enclosure of FIGS. 12 and 16.

Figure 17:
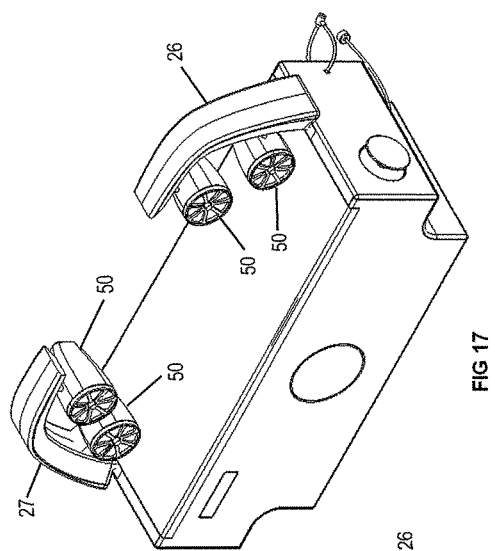
FIG. 17 shows the right front perspective view of the embodiment of FIG. 16 with speakers mounted on the arms.
Figure 18:
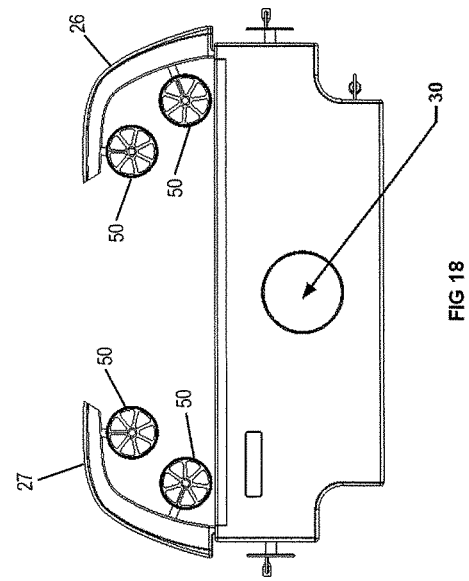
FIG. 18 shows the front perspective view of the embodiment of FIG. 16 with speakers mounted on the arms.

Similar to the view of the embodiment of the enclosure of FIG. 16, FIG. 17 shows the right front perspective view of an embodiment of FIG. 16 with speakers 50 now mounted on the arms 26, 27. In an alternate embodiment, speakers may be embedded in the arms 26, 27 instead of mounted/attached on the arms 26, 27. FIG. 18 shows the front perspective view of the embodiment of FIG. 17 with speakers 50 mounted on the arms 26, 27, and a subwoofer speaker opening 30. Similar to FIG. 17, FIGS. 26 and 27 show an embodiment which may be used by government agencies (e.g., emergency response, law enforcement, other security or safety related vehicle, etc.) for public announcement/mass notification (giant voice) events.

Figure 26:
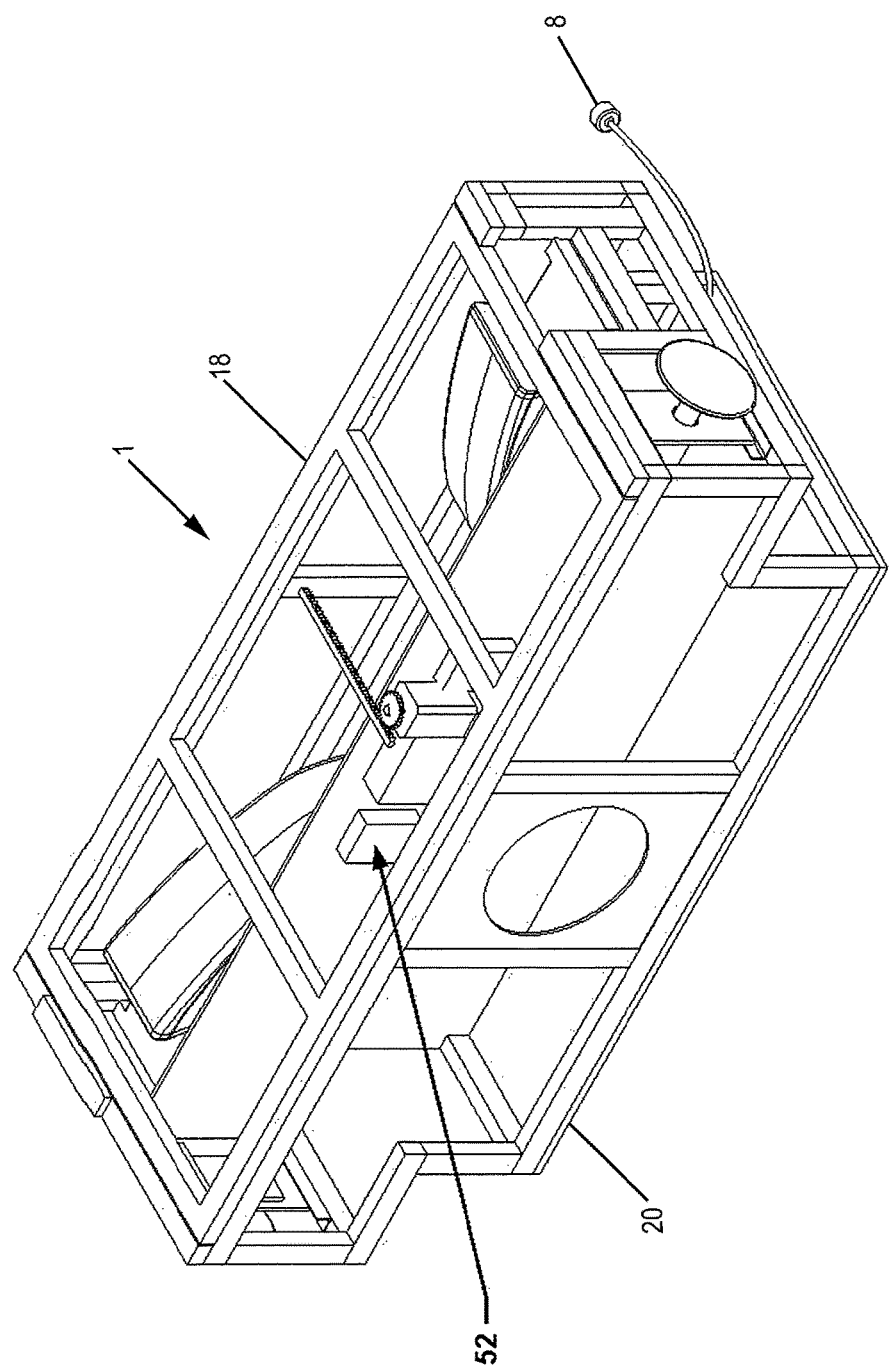
FIG. 26 shows a right front perspective view of a housing frame and lid frame when the lid is closed and a programmable logic controller mounted to the interior wall.

FIG. 26 shows a right front perspective view of a housing frame 20 and lid frame 18 of the enclosure 1 in an embodiment similar to FIG. 17. FIG. 26 shows a PLC controller 52 mounted onto the interior wall 22 and activated via switches located on the control panel 6. The programmable logic controller 52 may have a computer cable port (USB or other communication port) so that a computer cable can be connected in order to provide coding and programming for the run time of the motors. In other embodiments, the same information may be transmitted wirelessly (e.g., via Bluetooth).

Figure 27:
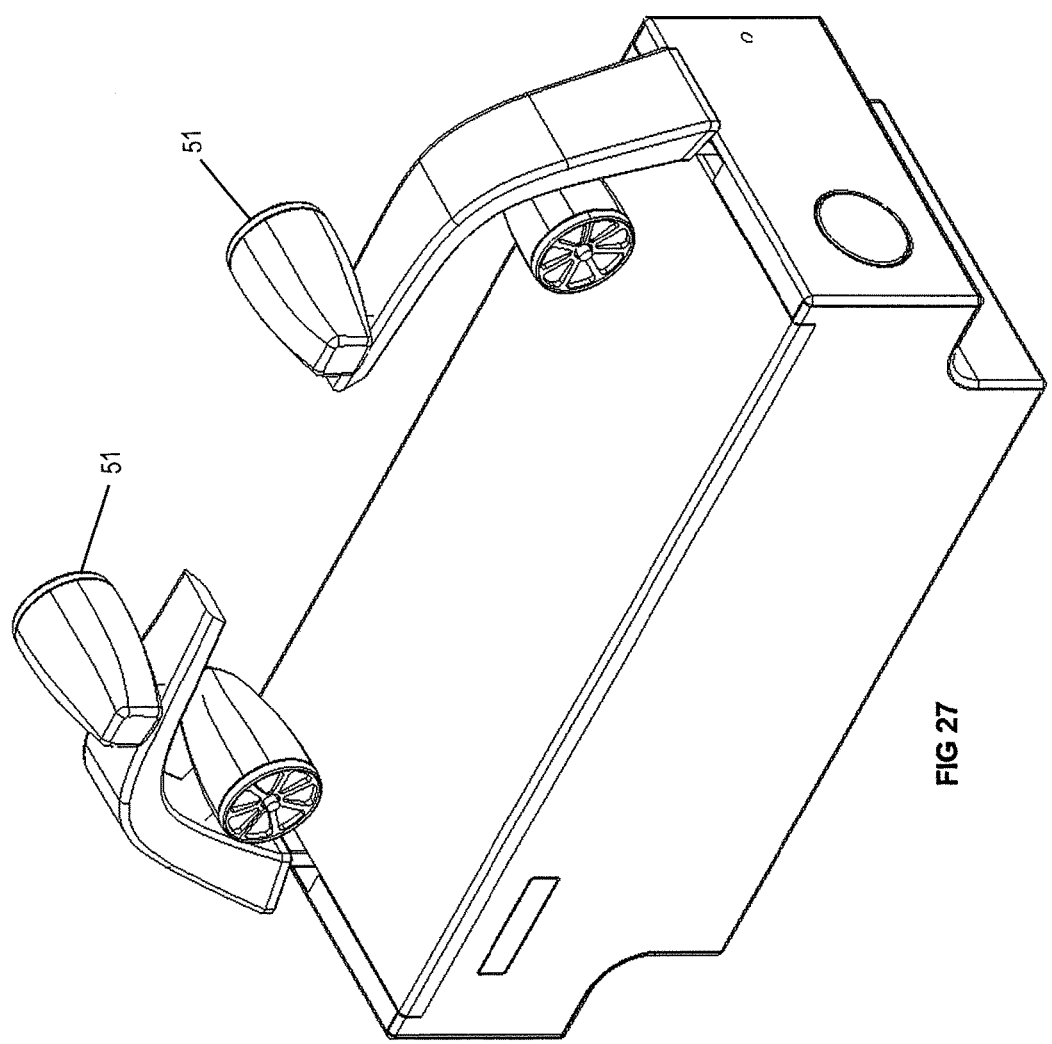
FIG. 27 shows a right front perspective view of an alternate embodiment with the arms deployed and speakers mounted in opposite directions and without a subwoofer.

FIG. 27 shows the right front perspective view of the embodiment of FIG. 26 with two front-facing speakers 51 mounted on the arms. In this embodiment, the speakers 51 are mounted such that they face forward while other speakers face rearward. The two speakers 50 may be rotated (prior to mounting) to face forward or to face in opposite directions. FIG. 27 further illustrates that the user can have multiple sound directions and may not need low sound frequencies (as for emergency vehicles utilizing systems for public address). The speakers may alternatively be mounted on swivels such that the speakers may be easily adjusted to change facing directions. In this embodiment, it may be not be necessary to include a subwoofer speaker/opening (as shown).

Figure 19:
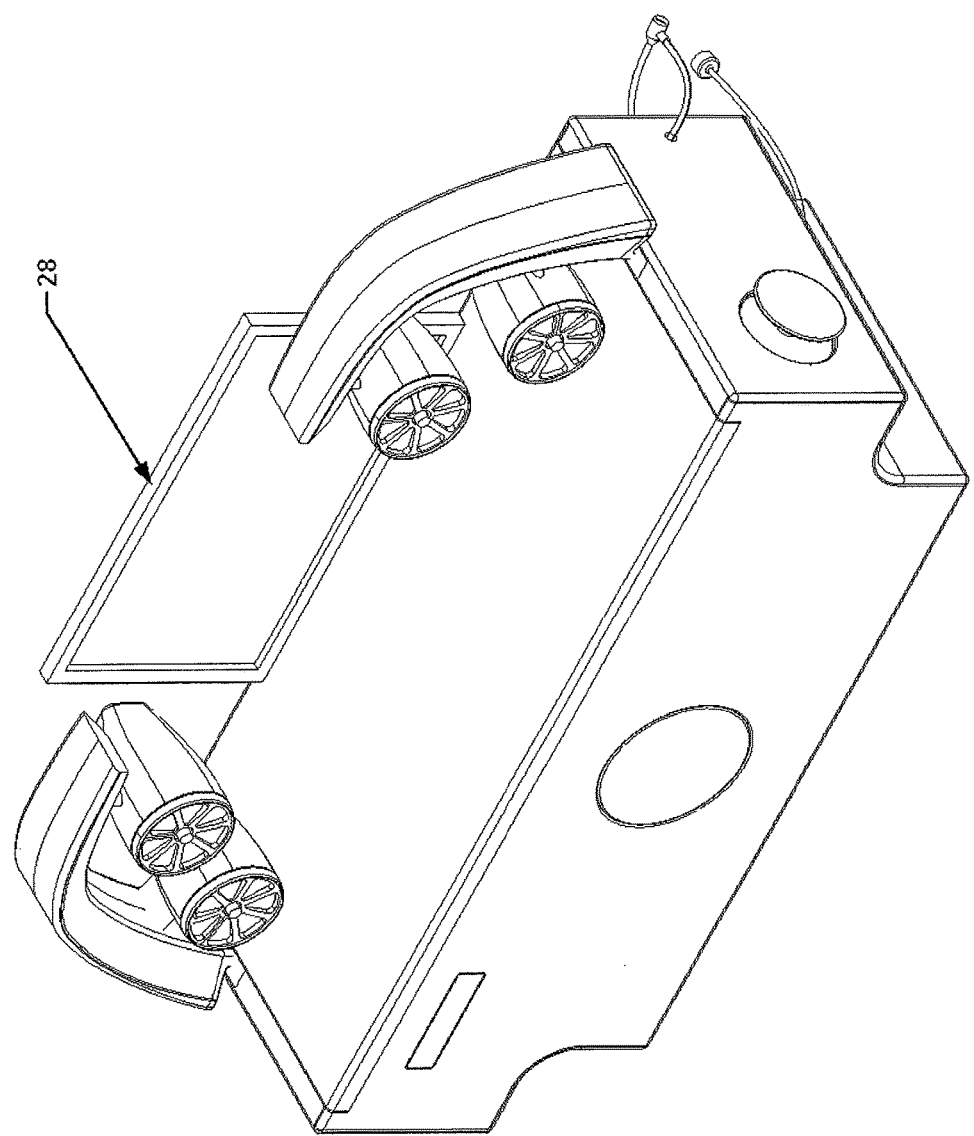
FIG. 19 shows the right front perspective view of the embodiment of FIG. 17 with a monitor mounted to the enclosure and which is deployed/extended.

FIG. 19 shows the right front perspective view of an embodiment of FIG. 17 with a small or medium sized flat panel monitor 28, mounted to the enclosure 1 and which is deployed/extended. The monitor 28 in this embodiment may be a mid-size monitor, such as, a regular size 36" flat screen or other size monitors may be used.

Figure 20:
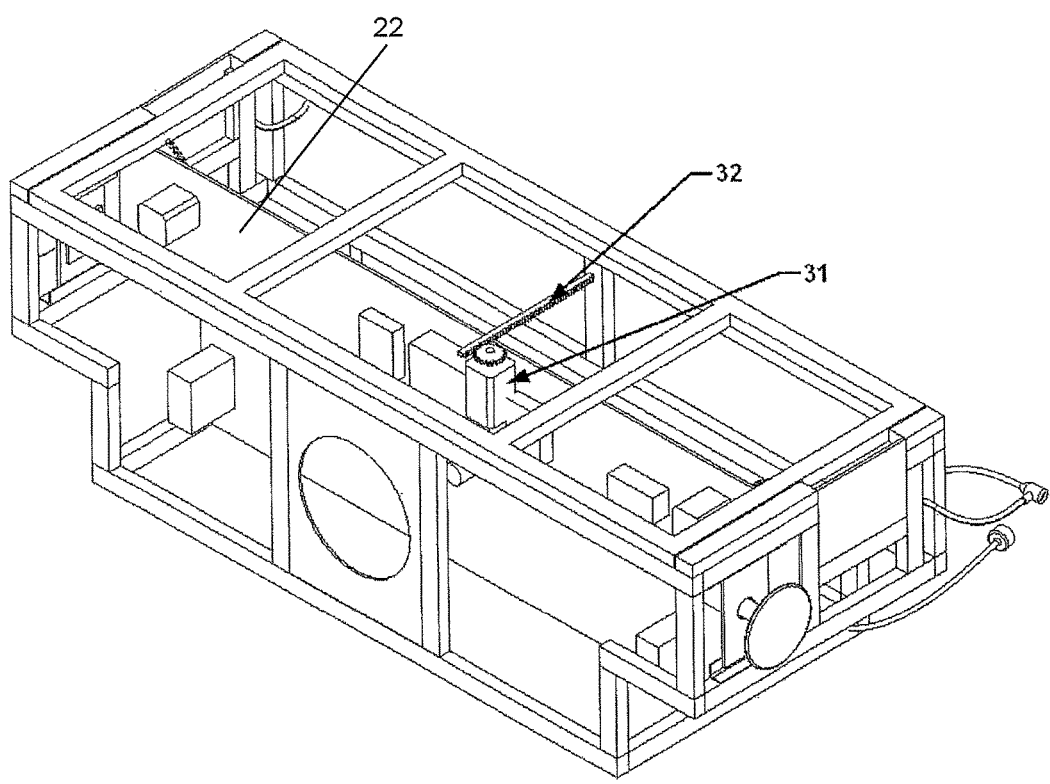
FIG. 20 shows the right front perspective view of the housing frame and lid frame when the lid is closed.

FIG. 20 shows the right front perspective view of the housing frame and lid frame when the lid is closed in respective alternate embodiments. Preferably, as shown in FIG. 20, the housing frame 20 of the enclosure 1 provides an electric motor 31 that interfaces with lid gear 32. This interacts with the PLC code, so many seconds and turns off and the position it wants to; close lid, open lid. The electric motor alternatively could be a lateral drive mechanism (as discussed with reference to FIG. 4 above). Further, a toothed lid gear 32, may be activated, via the control panel 6, by rocker-switches, remote controls, relays or other means to initiate the lid movement and to stop the lid movement when the rear compartment 16 has been exposed (lid gear 32 would be attached to the lid 4). In other embodiments, the lid movement mechanism 30 may be an electric motor, a track actuator, a linear actuator, linear drive mechanism or any other present or later developed technology for initiating movement of the lid. In alternate embodiments, the lid may move by other mechanisms such as manually, pulleys, cables, hydraulics, springs, or other methods.

Figure 22:
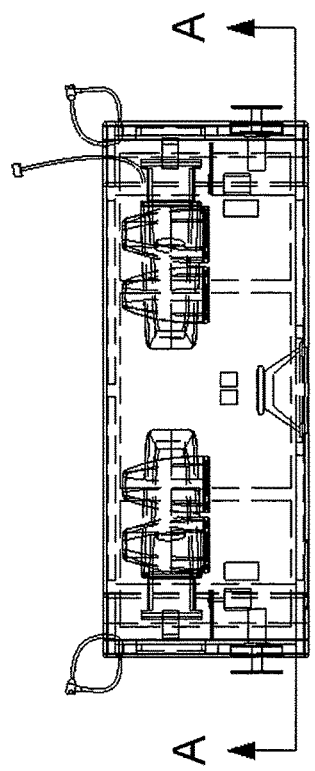
FIG. 22 shows the top cut-away view of the embodiment of FIG. 21.
Figure 21:
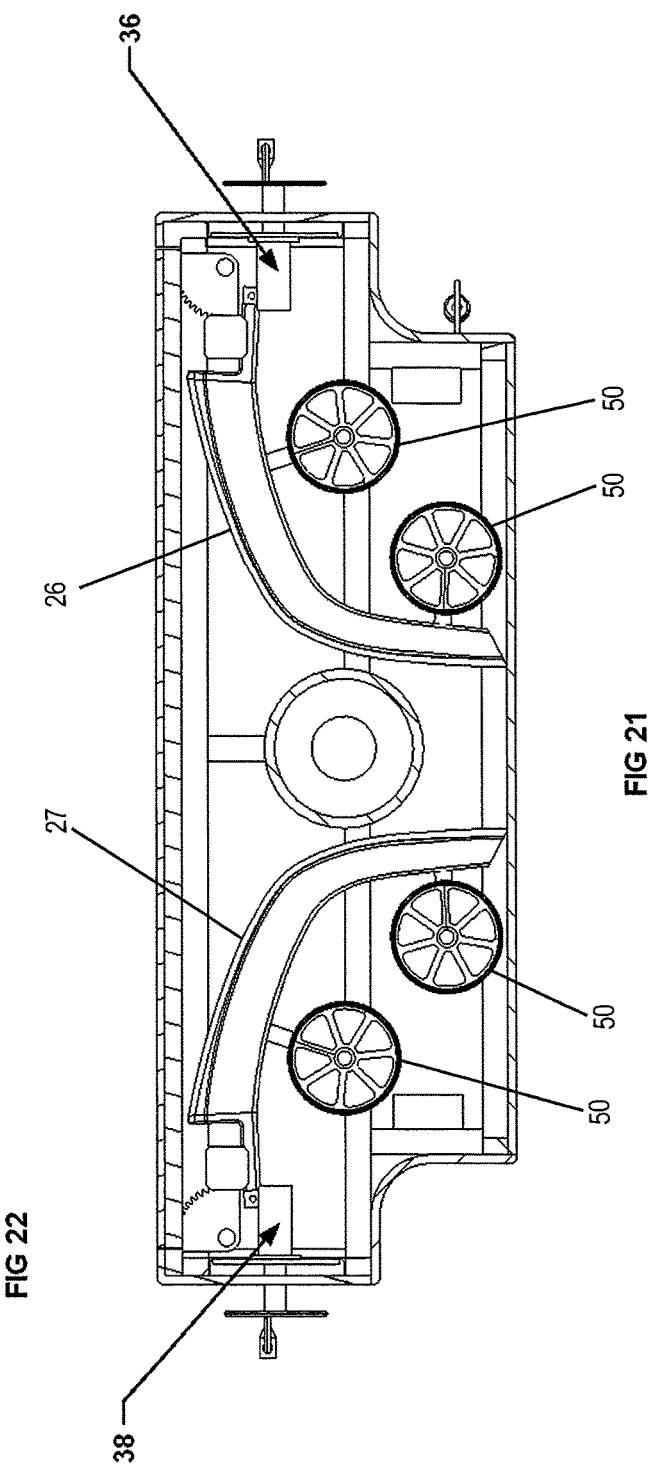
FIG. 21 shows the front cut-away view of an embodiment with arms, which are retracted and provide attached speakers.

FIG. 21 shows a front view cut-away view and FIG. 22 shows a corresponding top cut-away view illustrating another embodiment of the arms 26, 27 with speakers 50 retracted into the housing 2. In particular, FIG. 21 shows use of stabilizer plates and an alternative deployment and retraction mechanism. In particular, FIG. 21 shows an arm deployment and retraction mechanism comprising gear teeth at the base of the arms 26 and 27. Further, when first loaded into a truck bed, for example, the stabilizer plates 12 may be retracted into the housing 2. After the enclosure 1 is loaded into the truck bed, the stabilizer plates 12 may be extended by manually turning both the right and left stabilizer plate shafts 36 and 38 so that the stabilizer plates 12 put pressure on the inside of bed walls of the truck. The stabilizer plate shafts 36 and 38 may be threaded and, when turned, may extend so that the stabilizer plates 12 meet and apply pressure to the inside wall of the truck bed.

Thus, the stabilizer plates may act as a stabilizing mechanism for the enclosure and system. In other variations of the embodiment, the stabilizer plates 12 may extend via electric motors and gears, a linear actuator, springs, hydraulics or other mechanisms for exerting pressure so as to stabilize the enclosure 1 within the truck/vehicle. This operation may occur when the user unlocks and opens the control panel 6 cover with a key or keypad and then depresses a master-breaker switch to energize the power to the system. Other rocker-switches may activate the movement of the lid 4 (to the open position) and the movement of the mounting arms 26 and 27 (to the deployed position); and provide power to circuits of the audio-visual and/or other equipment. In an alternate embodiment, the user may alternatively use a remote control to activate the lid 4 and mounting arms 26 and 27 movement.

Figure 23:
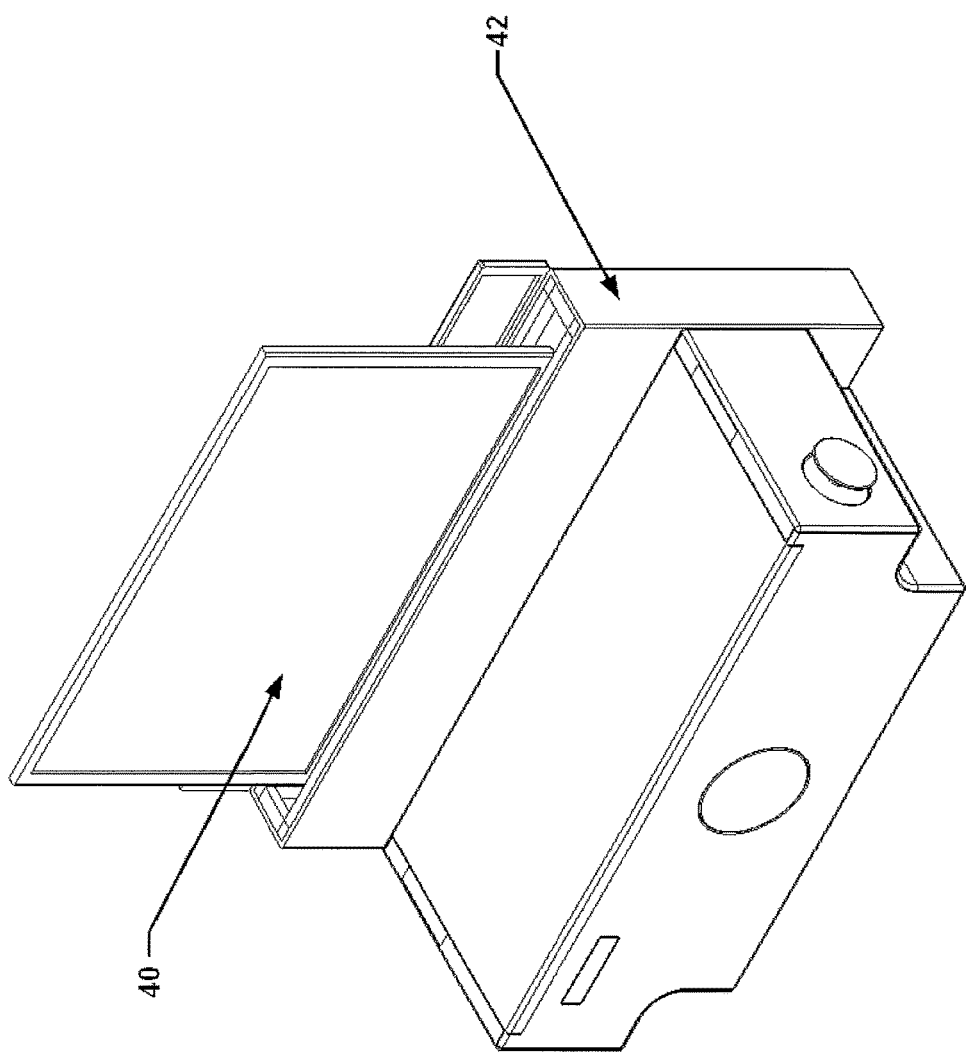
FIG. 23 shows the right front perspective of an alternate embodiment of the housing with an additional housing compartment for a large screen flat panel monitor, which is deployed/extended.

After the mounting arms 26 and 27 are partially or fully deployed, the user may desire to operate the attached speakers 50 or other audio visual equipment wirelessly (e.g., via blue-tooth devices like smartphones, media players (e.g., mp3 players), tablet computers, laptops, in-vehicle computer or navigation systems and/or other wireless communication devices). In alternate embodiments, if the user's vehicle has satellite or internet capabilities, then these technologies may also be integrated and used for the audio and video feeds. These capabilities may be managed via the control panel 6 (discussed above) or managed directly via the remote user device FIG. 23 shows the right front perspective of an alternate embodiment of the housing with an additional housing compartment for a large screen flat panel monitor 40, which is deployed/extended from a separate monitor compartment 42. The embodiment of FIG. 23 preferably includes (as shown in FIG. 24) vertical mounting arms 46 and two openings for speakers 44, such as square openings covered by sub-woofer grills. In FIG. 24, when the large flat panel monitor 40 is deployed, the user may operate the large flat panel monitor 40 via a personal user device or via the control panel 6 to control the audio and/or visual components (as discussed above). If the user's vehicle has satellite or internet capabilities, then these technologies may also be integrated and used for the video feeds.

Figure 25:
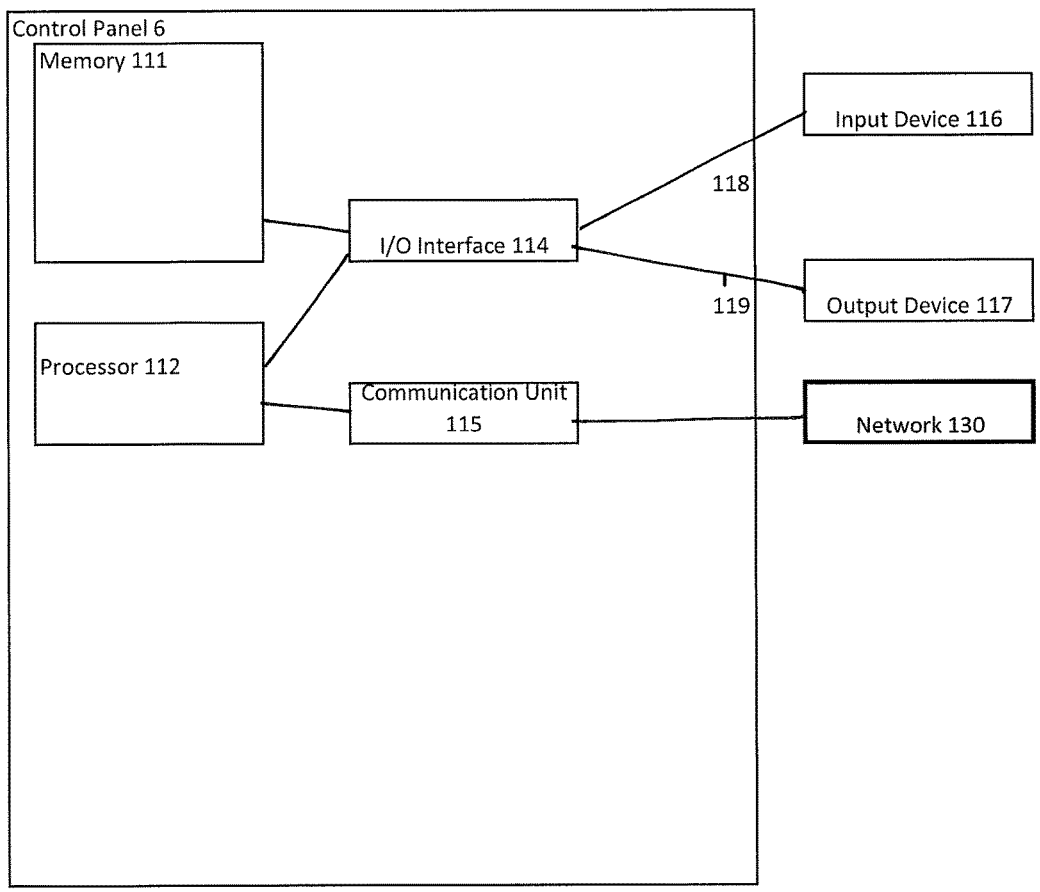
FIG. 25 shows a block diagram of control panel of the embodiment of FIG. 1.

FIG. 25 shows a block diagram of a control panel 6, which may also include a memory 111 for storing computer executable instructions, and a processor 112 configured to execute the computer executable instructions stored in the memory 111. For example, the PLC code (discussed below) may be stored in the memory 111. The memory 111 can be implemented using any appropriate combination of re-writable, volatile or non-volatile memory or read only (fixed) memory. The re-writable memory, whether volatile or non-volatile, can be implemented using any one of the following: static or dynamic random access memory (RAM), a floppy disk and disk drive, a writeable or rewriteable optical disk and disk drive, a hard drive, flash memory, or the like. Similarly, the non-alterable or fixed memory can be implemented using any one or more of ROM, PROM, EPROM, EEPROM, an optical ROM disk, such as CD-ROM or DVD-ROM disk and disk drive, or the like. The processor 112 can be a CPU (central processing unit), an MPU (optionally including a RAM and/or ROM), or any known or later-developed processor, circuit, or device for executing programs and instructions so as to operate the control panel.

FIG. 25 further shows the control panel 6 may also contain ports and jacks for USB connections, laptop connections, microphone connections and other multimedia devices. The said switches, ports, and jacks may be located on either the outside as facing the control panel 6, or to the interior facing the interior mounting wall 22. The user device 110 may further comprise an Input/Output (I/O) interface 114 communicably coupled to an input device 116 and/or an output device 117 via links 118 and 119, respectively. The input device 116 may be one of or any combination of a switch or button, a keyboard, a mouse, a trackball, a touchscreen, a virtual reality glove, a sensor (e.g., biometric sensor), and any known or later-developed device for inputting data and/or control signals to the control panel 6. The output device 117 may be one of or any combination of a monitor (e.g., flat screen monitor 50, computer monitor, LED monitor), a cathode ray tube, a liquid crystal display (LCD), a touchscreen display device, an image projector, an electrophoretic display, a virtual reality device, an audio speaker (e.g., speakers 50), and any other known or later-developed device for visually displaying or audibly outputting the data output from the control panel 6. Each of the various links 118 and 119 can be any known or later-developed device or system for connecting the input device 116 and the output device 117, respectively, to the I/O interface 114. In particular, the links 118 and 119 can each be implemented as one or more of a direct cable connection, a connection over a wide area network, a local area network or a storage area network, a connection over an intranet, a connection over an extranet, a connection over the Internet, a connection over any other distributed processing network or system, and/or an infrared, radio-frequency or other wireless connection.

In a preferred embodiment, the control panel includes an input unit, such as a button or switch. When user input is received, via the button/switch or another device configured to transmit input information to the control panel, a computer-implemented method for deployment of audio visual equipment from a vehicle as a base may be initiated. In particular, then this computer-implemented method beings the program that controls the deployment and/or retraction mechanism to mechanically open the lid and lift and extend/deploy the arms based on inputs corresponding to time durations for motor drive. For example, the motors may be configured to operate a certain amount of rotations to fully open or close the arms and lid. The amount of rotations may be pre-calculated by using the dimensions of the gears in the gearbox, the motor shaft's diameter, and the anticipated required movement length of the target arms when opening/closing. The method and corresponding program may include a loop calling open and close functions depending on whether a digital pin reads high or low. With this program, both the right and left arms could by simultaneously deployed and retracted (at the same time). The program may be implemented through the use of a programmable logic controller (PLC) and a motor controller.

The control panel 6 may further comprise a communication unit 115 (which may comprise a network interface card) that is communicably coupled to the network 130 and that allows the control panel 6 to communicate, via the network 130, with a wireless or Bluetooth device (as discussed above). In alternative embodiments, the control panel may be removed and the communication between the wireless or Bluetooth device may be carried out directly between the wireless or Bluetooth device and the output devices directly (e.g., the audio visual components such as speakers 50 and monitor 28, which may have Bluetooth/wireless capabilities themselves).

The control panel 6 may also include circuit, routine, or applications, (e.g., the PLC code discussed above) which may be implemented by one or more programs executed by the processor 112. In certain embodiment, the circuits, routines, or applications may allow a user to: operate the audio/visual equipment, control the actuators to open/close the lid and/or cause the motorized arms to deploy or retract, and/or control other devices/components/equipment in or outside of the housing to perform known functions.

Figure 28:
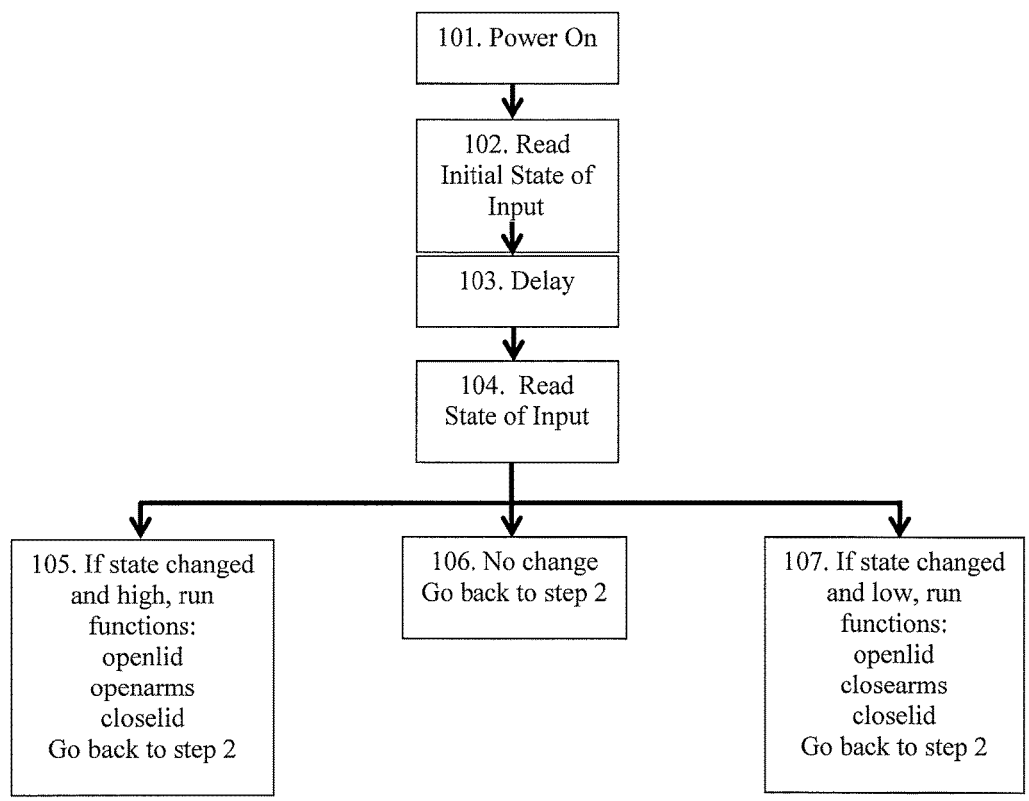
FIG. 28 shows a block diagram of exemplary steps of a computer program (Program Logic Control) for opening/closing of the lid and deployment of the arms.

The PLC may be stored on a non-transitory computer readable medium for subsequent execution by a processor (CPU). For example, FIG. 28 shows steps of an exemplary PLC for use as a computer-implemented method for deployment of the motorized arms and/or for controlling the lid to open/close. In particular, FIG. 28 shows a block diagram of a programmable logic control (PLC) for a motor controller that can utilize a program to lift and retract mounting arms 26 and 27 and open and close the lid 4, based on travel distance. The motors operate a certain amount of rotations to fully open or close the lid 4 and deploy the mounting arms 26 and 27. The amount of rotations can be calculated by using the dimensions of gears in a gearbox, a motor shaft, and length the components needed to move to be opened, closed, or deployed. The PLC program can consist of a loop calling open and close functions depending on whether a digital pin reads high or low. A function can be created so both mounting arms 26 and 27 can operate at the same time.

Figure 29:
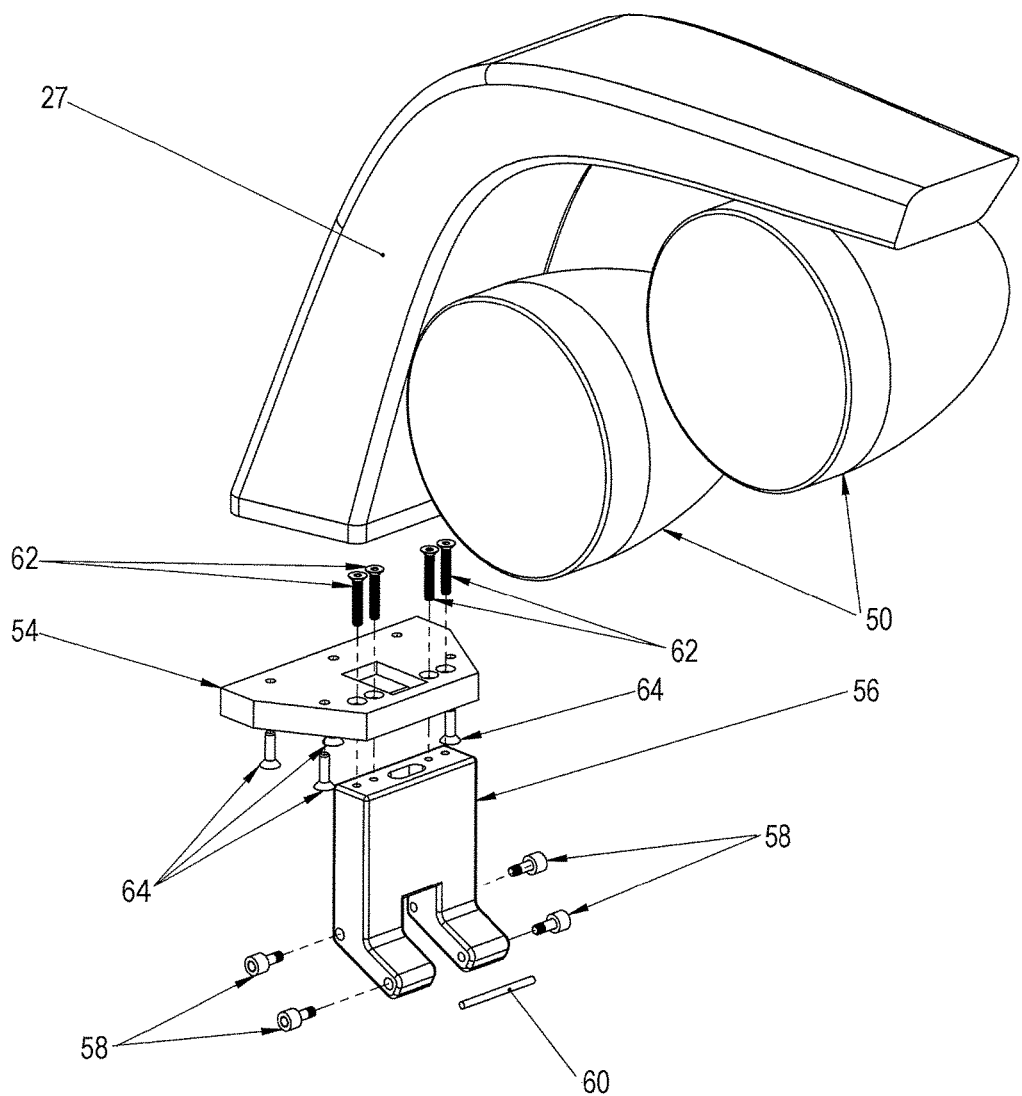
FIG. 29 shows an enlarged right front perspective of an exploded view of one mounting arm including a drive bracket, a drive bracket pin, and cam rollers.

The deployable mounting arms may be configured to include a deploying/retraction mechanism. For example, FIG. 29 shows a zoomed in exploded right front perspective view of an embodiment of a deployable mounting arm with speakers. The deployable mounting arms may be configured to attach with a mounting plate 54, which is attachable to a drive bracket drive bracket 56. The drive bracket drive bracket 56 may be configured (as shown in FIG. 29) to have one or more cam rollers 58 inserted therein (there are four cam rollers 58 in FIG. 29). The drive bracket pin 60 runs on a same axis as the cam rollers 58 and may connect on opposing ends with cam rollers 58.

Figure 30:
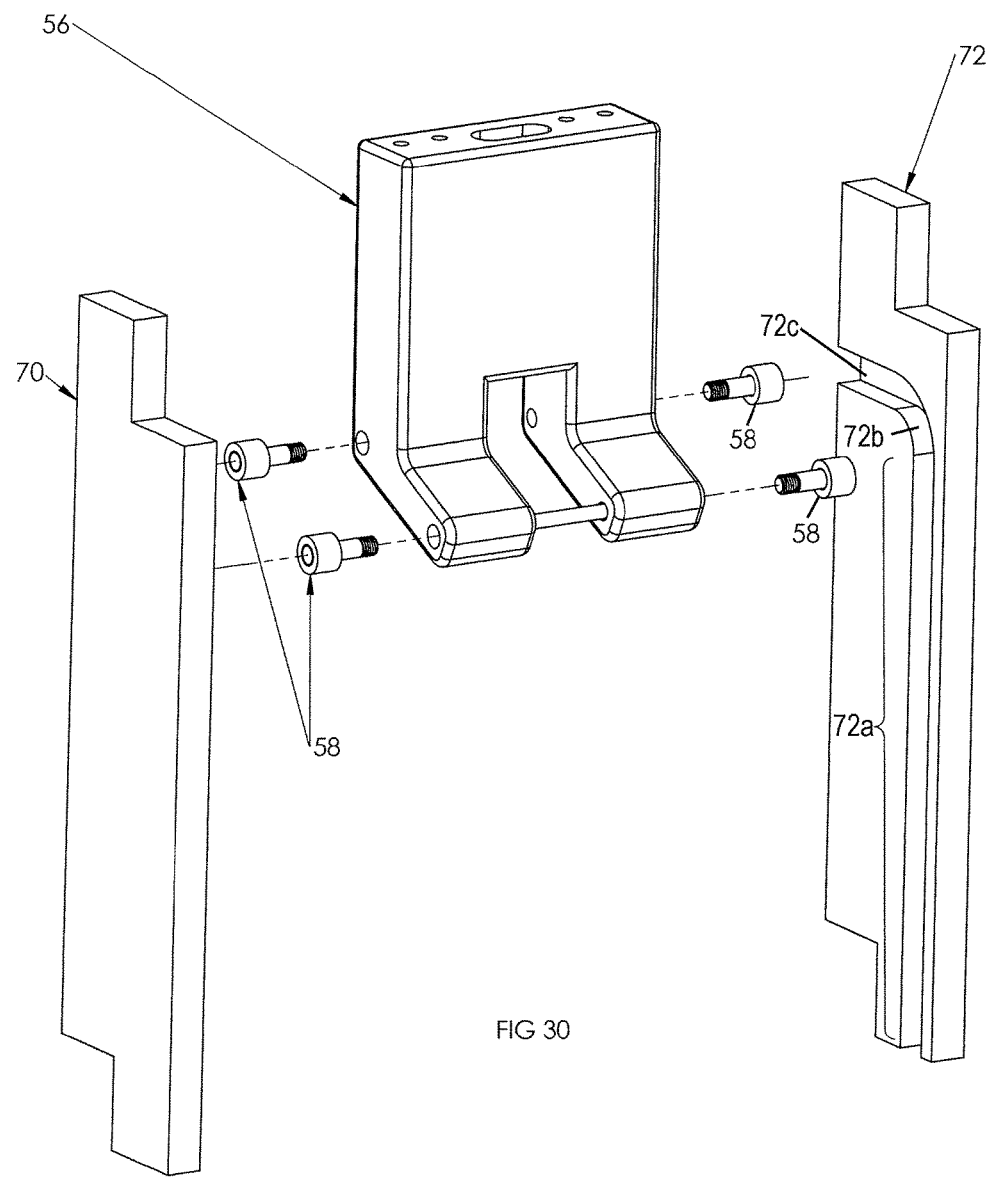
FIG. 30 shows an enlarged exploded front perspective view of an embodiment of the front and rear bracket guides.
Figure 31:
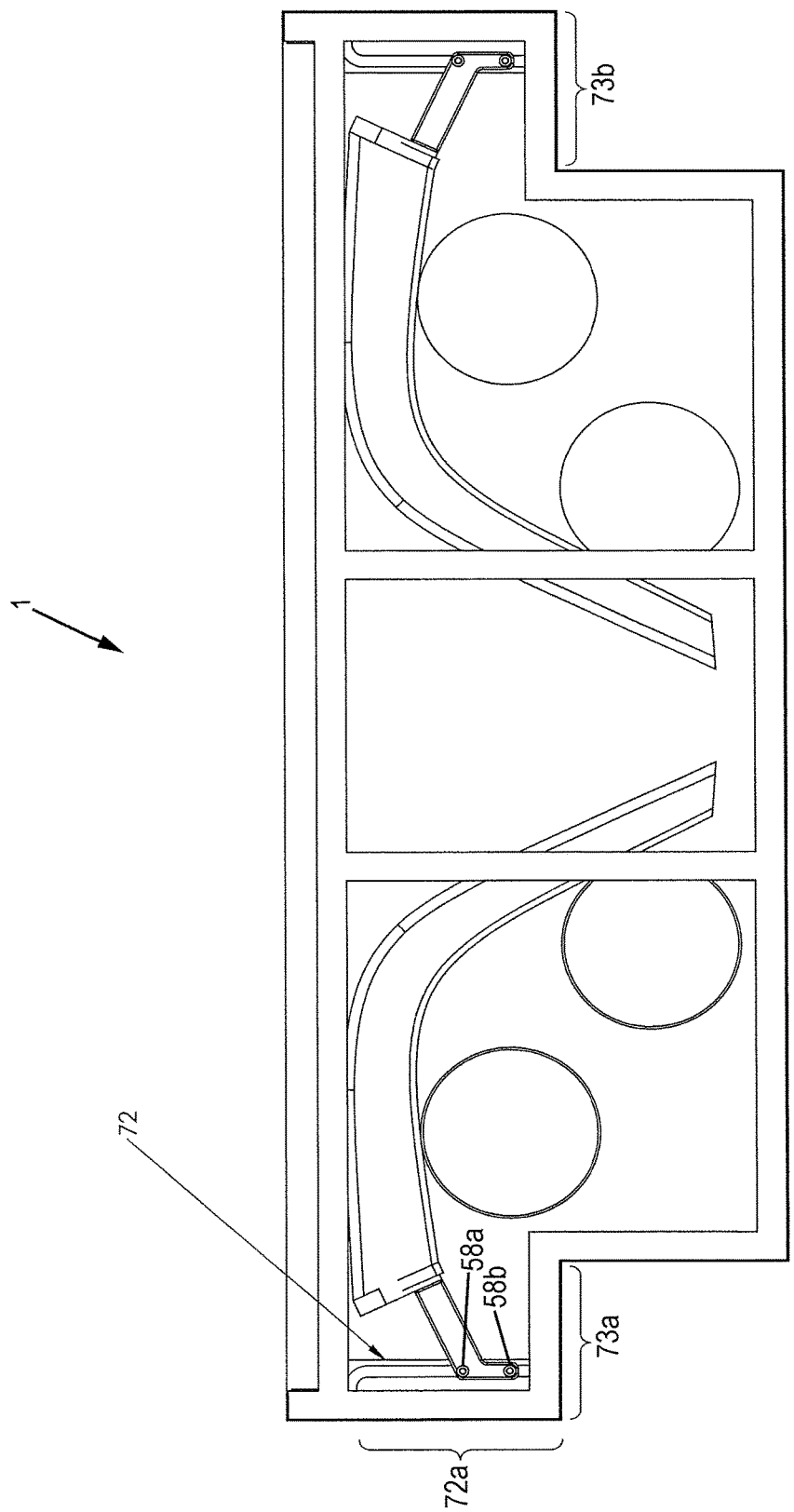
FIG. 31 shows a front cut-away view of an enclosure with mounting arms in a pre-arm-deployment state (arms fully retracted).
Figure 32:
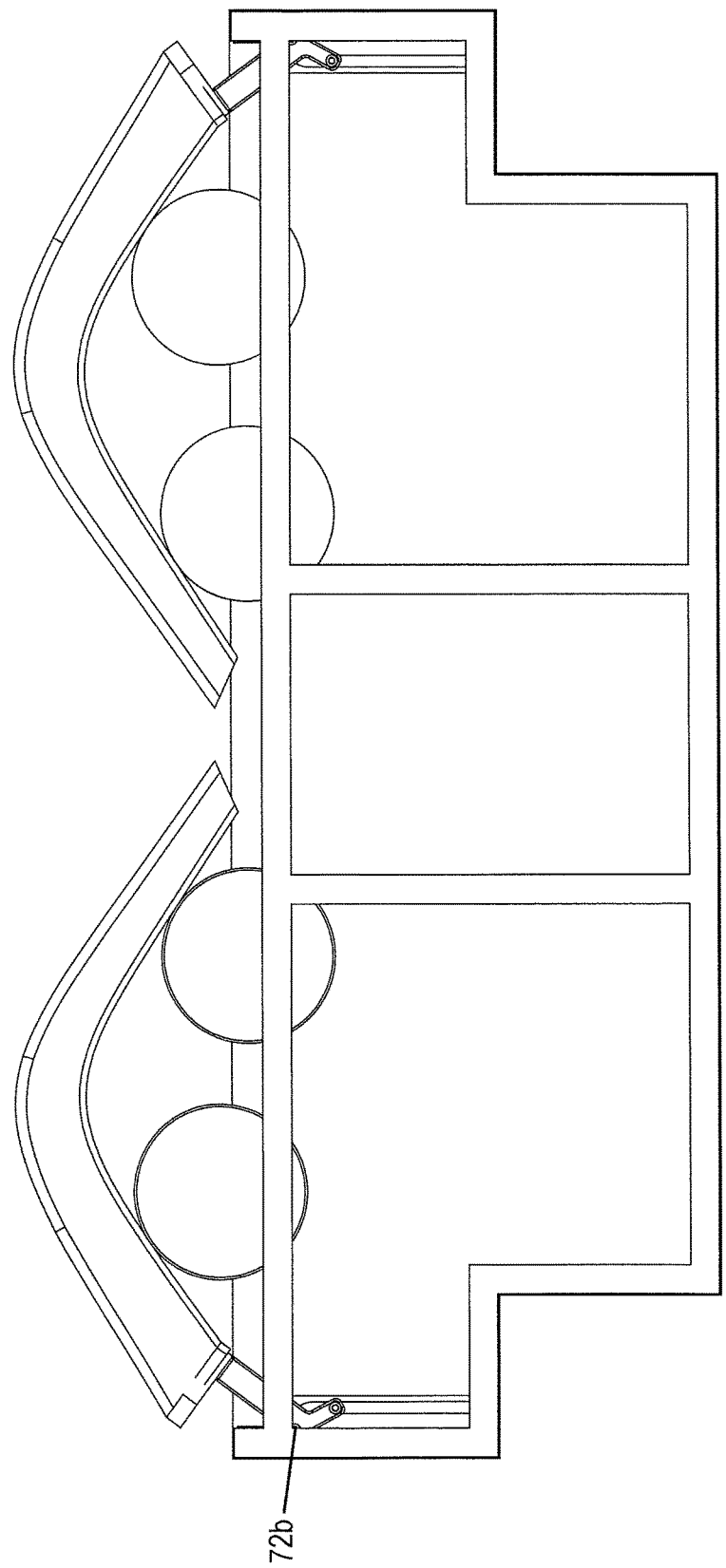
FIG. 32 shows a front cut-away view of the enclosure of FIG. 31 with the mounting arms in a first state of arm deployment (arms mid-way deployed).

The cam rollers 58 (see FIGS. 29-30, 34 and 35) may be configured to move within a specifically designed guide (left front bracket guide 70 and left rear bracket guide 72 that allows for unique movements of the arms (see FIGS. 31-33, which show a pre-deployment state and a transition to first and second states of deployment). The bracket guides have channels or slots (or grooves for the rollers) machine (cut) into the bracket guides. The rotary transmission of the mounting arms may be accomplished by electric motors and mechanical screws which may be activated, such as, by signals from the control panel 6, to cause the mounting arms 26, 27 to extend/deploy and/or retract by rocker switches, remote controls, relays or other mechanisms. In other embodiments, the mounting arms 26, 27 may move by other mechanisms such as linear actuators, gears, manually, pulleys, cables, hydraulics, springs, and/or other mechanisms.

FIG. 29 shows a right front perspective of an exploded view of an assembly of components of the left mounting arm 27 with speakers 50 attached. A top bracket plate 54 may be mounted to mounting arm 27 with arm bolts 64. The top bracket plate 54 may be attached to the drive bracket 56 with top bracket bolts 62. The drive bracket 56 may have cam rollers 58 and a drive bracket pin 60 attached. This embodiment shows one method for the assembly of the drive bracket 56 and the mounting arms 26 and 27. There may be other methods including welding and other means to attached components that could be used in an assembly.

As shown in FIG. 29, the drive bracket 56 may also include a drive bracket pin 60 to act as a guide. The top bracket plate 54 may be attached to the arm 27 via screws 52, that are threaded into threading portions 64.

FIG. 30 shows a right front perspective of an exploded view of the drive bracket 56 with the cam rollers 58 and left front bracket guide 70 and the left rear bracket guide 72. This shows a method of movement as the drive bracket 56 travels vertically, the cam rollers 58 are seated inside the left front bracket guide 70 and the left rear bracket guide 72 and provide control of the movement of the mounting arms 26 and 27. The movement of the mounting arms starts upward in a vertical position until the top cam rollers 58 reach the point where the left front bracket guide 70 and the left rear bracket guide 72 channels turn outward. This controlled movement allows the base of the mounting arms 26 and 27 to have a wider outside dimension, after full deployment, than the housing 2 dimension. This controlled movement allows the mounting arms 26 and 27 to start from closed position and travel vertically and then near the end of their movement, to rotate outward, such that a wingspan of the arms may be as wide as the vehicle.

In other words, FIG. 30 shows how the inserted cam rollers 58 may be configured to be guided by left front bracket guide 70 and left rear bracket guide 72. The left front bracket guide 70 and left rear bracket guide 72 each have concave continuous channels. The channels may include channel portions 70a-70c and 72a-72c, respectively, which allows the drive bracket 56, when driven, to cause the position and angle of the mounting arms 26 and 27 to change. In other words, these channel portions 70a-70c and 72a-72c may be modified to change the manner in which the arms deploy. In this embodiment, for example, channel portion 72a is vertical and extends approximately 80% of the length, channel portion 72b is a transitional curved channel portion, which connects channel portions 72a and 72c. Channel portion 72c is substantially horizontal, and when the two top cam rollers 58 reach the end of channel portion 72c the arms are caused to be in the fully deployed state. FIG. 30 shows the arms in a fully deployed state.

Figure 34:
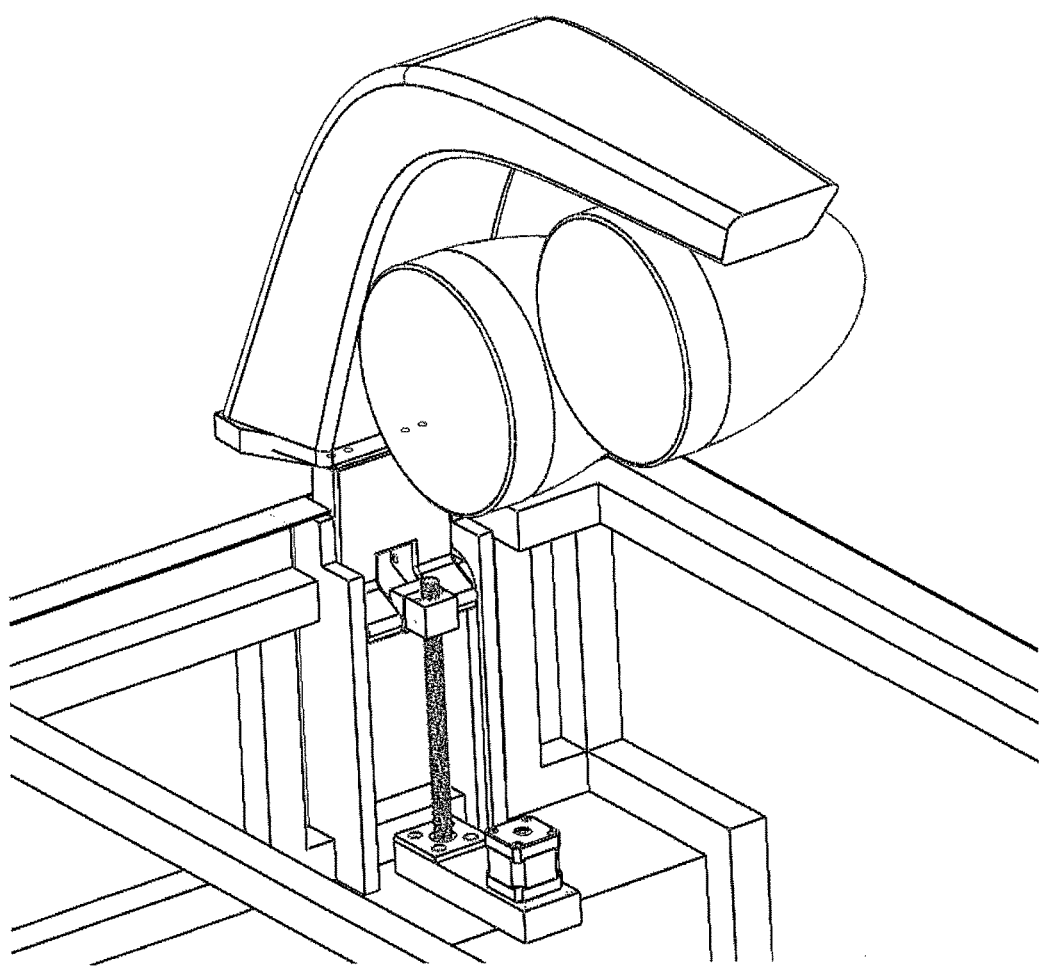
FIG. 34 shows a close up view of a right front perspective view of FIG. 1 with lid removed and a mounted drive assembly.

FIG. 31 shows a front cut-away view of the system with arms fully retracted and the drive bracket and cam rollers in an arm pre-deployment state (the lowest/closed/retracted position). The left rear bracket guide 72 may be installed to the frame 20 with bolts, welding, or other methods. All four cam rollers 58 are seated into channels of the left front bracket guide 70 and the left rear bracket guide 72 aligned for the vertical movement. The arms in the arm pre-deployment state may have left front bracket guide 70 and left rear bracket guide 72 configured similarly to FIG. 30. As shown, left front bracket guide 70 and left rear bracket guide 72 may be located within a respective left protruding portion 73 of the enclosure 1 (preferably in the rear compartment on the left hand side as shown in FIG. 34). In this configuration, the left front bracket guide 70 and left rear bracket guide 72 may rest on a shelf connected to the frame 20 or side panels. The left front bracket guide 70 and left rear bracket guide 72 may be the same length as the protruding portion 73 or may be longer or shorter than the protruding portions.

FIG. 32 shows a front cut-away view of the system with arms partially deployed and the drive bracket and cam rollers 58 in mid-travel position. As shown, the top two cam rollers 58 have begun the outward movement, transitioning from the vertical to the horizontal orientation of left front bracket guide 70 and left rear bracket guide 72. Lower cam rollers 58b are still within channel 72a, but the upper cam rollers 38a are entering channel 72b.

The deployment of the arms within the left front bracket guide 70 and left rear bracket guide 72 may be controlled by a motor that drives the drive bracket 56 vertically. For example, the above discussed PLC code may be used (although other program codes may be suitable as well). When the PLC code executes to deploy the arms, as shown in FIG. 32, the arms are controlled to enter a first state of arm deployment (because driving the drive bracket vertically causes the arms to rise vertically, but does not change the angle of the arms). The arms are simultaneously driven vertically and are guided by left channel portions 72a-72c (and corresponding right channel guide portions). The arms 26 and 27 are now in a first state of arm deployment in FIG. 32. The first state of arm deployment may be approximately 80%, but any range (e.g., above a majority (50%)) may be suitable.

In other words, as shown in FIG. 32, bottom cam rollers 58b travel nothing but vertical (i.e., they never enter channel portion 72c). The top cam rollers 58a travel 80% of the length of left front bracket guide 70 and left rear bracket guide 72, then because of transition portion 72b, they enter into channel 72c and travel vertically. This causes the arms to deploy by changing the angle of the arms. The cam rollers have traveled 80% of the length of the left front bracket guide 70 and left rear bracket guide 72, but the arms are only half deployed (because the angle of the arms is still parallel to the bottom of the housing). The left front bracket guide 70 may be configured identically (or substantially identically) to include guide portions similar to 72a-72c, which may be a length that corresponds to approximately 80% of left front bracket guide 70. This configuration causes the cam rollers to simultaneously travel horizontally 80% of the length of both the left front and rear bracket guides 70 and 72, which causes the arms to rise vertically.

As discussed above in FIG. 28, the states of arm deployment may be executed by the PLC code described above. For example, in Step 101, the motor controller may be powered on. In Step 102, an initial state of input is read. In Step 103, a delay for a predetermined time may be initiated. In Step 104, a second read of a state of input (user input) may be received. A determination of whether a state has changed is made and if the state has changed, and is above a maximum threshold, the PLC may, as shown in Step 105, initiate arm deployment functions (e.g., open lid, open arms, close lid). If the state has changed, but the input is below a minimum threshold, the PLC may require running the arm retraction functions (e.g., open lid, close arms, close lid). At the end of the arm deployment functions or if the state has not changed (as in Step 106), the code may loop back to Step 102. For example, in Step 105, the lid may open, and the open arms function may include the first state of arm deployment, and a second state of arm deployment.

FIG. 33 shows a second state of arm (full extended/deployed) deployment where the cam rollers 58 have now entered the gutter portion 72c. In FIG. 33, the arms are fully extended/deployed. FIG. 34 shows a close up view of how the drive bracket 56 may be attached to a frame of housing in a preferred embodiment. FIG. 33 further shows a front cut-away view of the system with arms fully deployed and the drive bracket and cam rollers 58 also in the fully deployed position. The top two cam rollers 58 have been horizontally extended on a path and are close to the outside of the housing 2. The bottom two cam rollers 58 remain in the vertical path of left front bracket guide 70 and the left rear bracket guide 72 channel.

FIG. 34 shows a right front perspective of the mounting arm 27 and speakers 50 with the left front bracket guide 70 and the left rear bracket guide 72 mounted in the rear compartment 16 of housing 2 and inserted between the frames 20. FIG. 34 also shows a power screw assembly that may be used to power the drive bracket 56. Other methods to power the drive bracket 58 include pulleys, springs, hydraulics, and other means.

Figure 35:
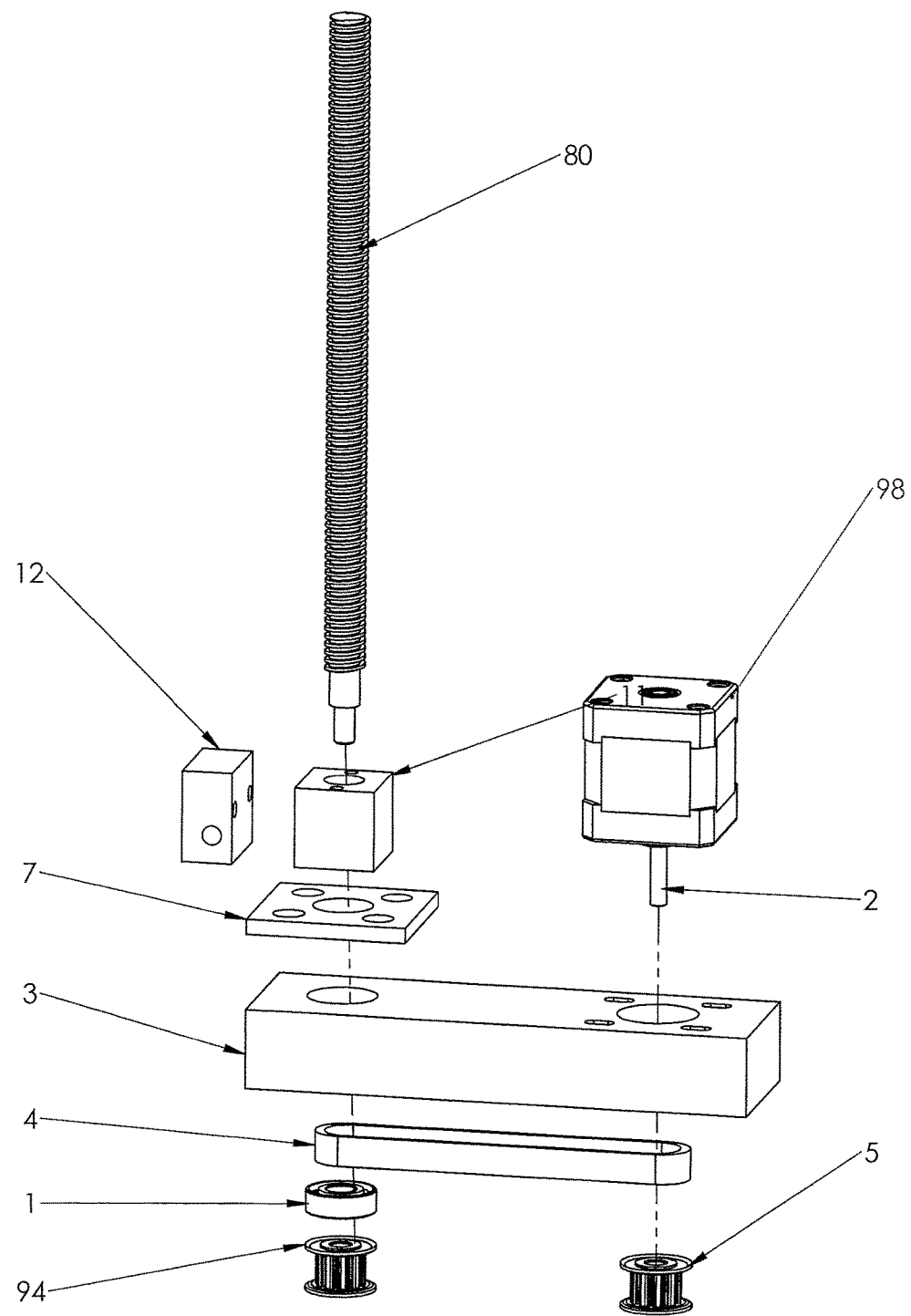
FIG. 35 shows a right front perspective of an exploded view of the drive assembly.

FIG. 35 shows a right front perspective of an exploded view of a power screw drive assembly. In particular, FIG. 35 shows how a power screw may assemble components including the power screw 80, the power screw threaded nut 82, the drive bracket pin block 84, power screw spacer 86, and the drive assembly housing 88. FIG. 35 also shows the drive belt 90, the drive screw bearing 92, drive screw pulley 94, and the motor shaft pulley that all fit inside the bottom portion of the drive assembly housing 88. FIG. 35 also shows the motor 98 and the motor shaft 100. The motor 98 is connected with wires leading through the interior mounting wall 22 into the front compartment 14 and connected to the programmable logic controller 52 and initiated by the control panel 6.

Figure 36:
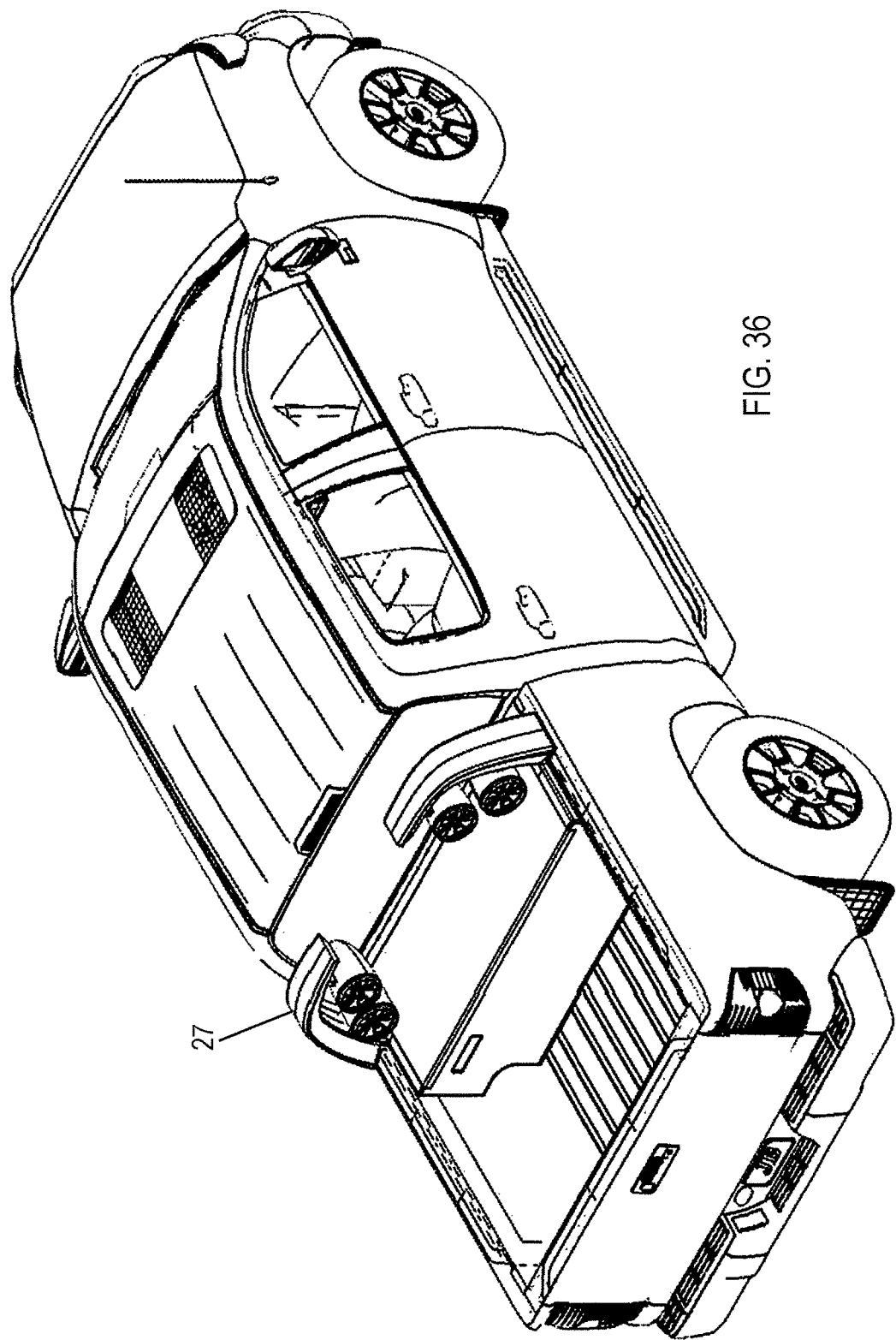
FIGS. 36-38 show a system and enclosure in an embodiment within a vehicle.
Figure 37:
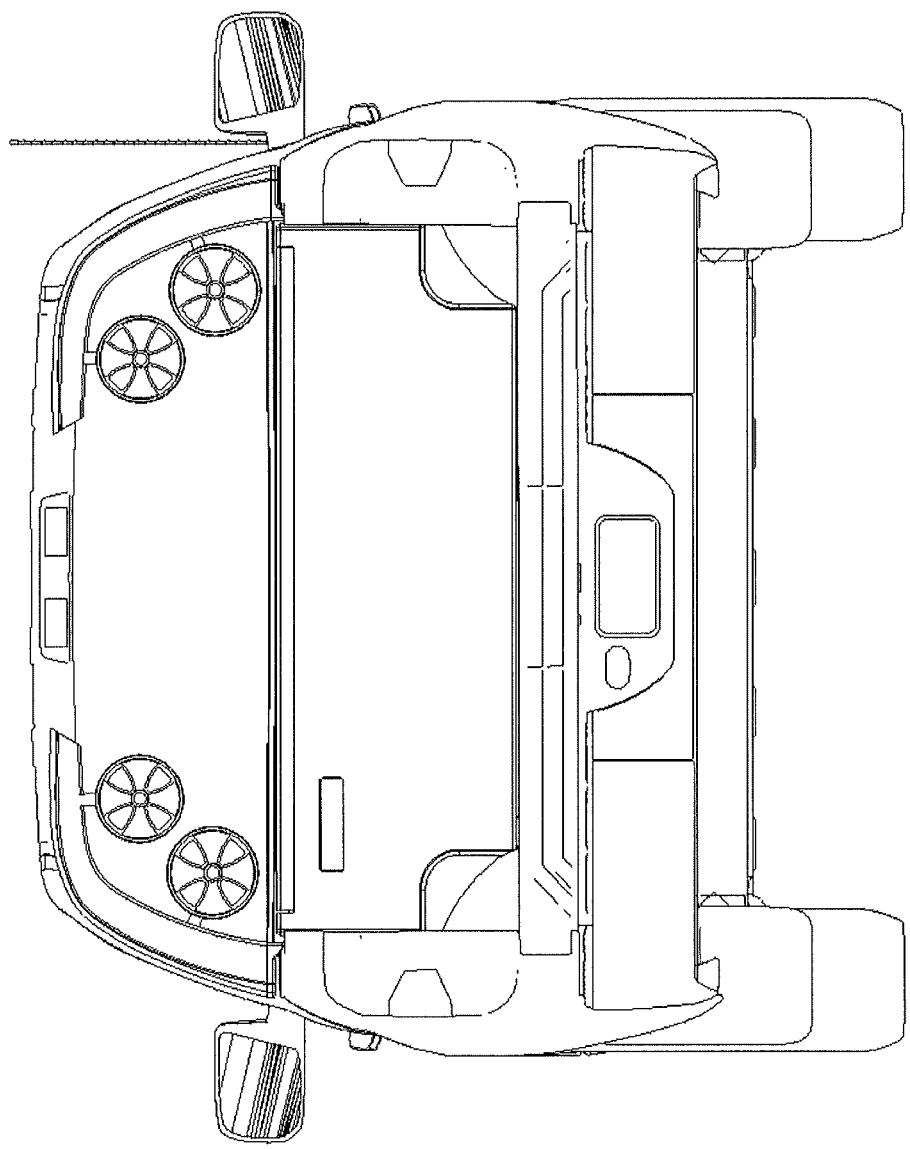
Figure 38:
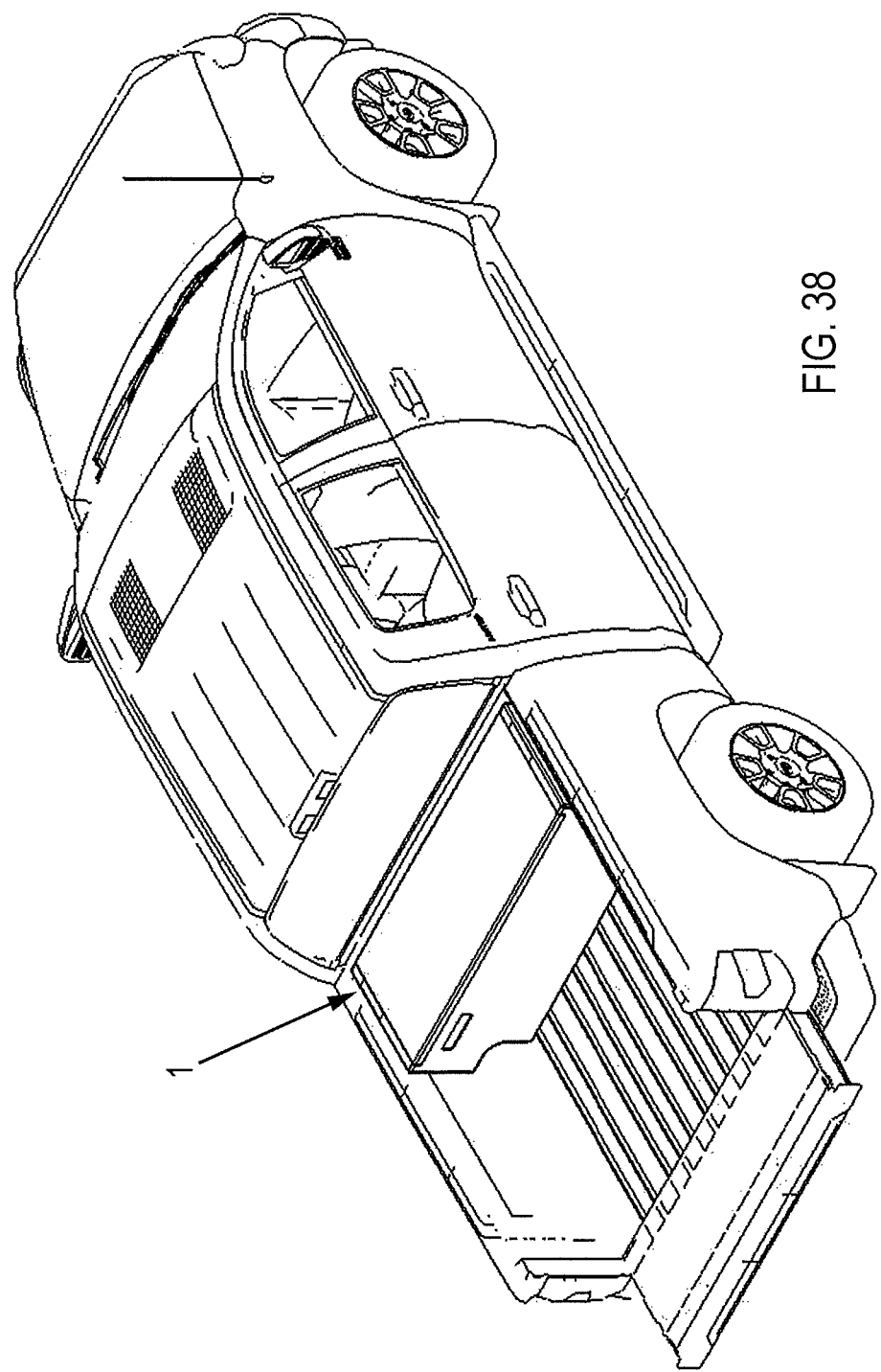

FIGS. 36-38 show a system and enclosure in an embodiment within a vehicle. As shown, the housing is positioned in a bed of a truck (vehicle) and may be transported. Further, the vehicle may act as a base of deployment (as shown in FIGS. 36-38).

In other embodiments, the housing may provide a camera or camcorder such that users may capture images or record video of their event and/or provide playback on the monitor 28 using digital camera software or video cameras. When the event is over, the user may use the manual or smart device controls to stop the play and shut down power to the audio and visual equipment. The user may then use either remote controls or switches in the control panel 6 to retract the mounting arms 26 and 27 into the rear compartment 16 and close the lid 4 and then turn off the master breaker. The user may then lock the control panel 6 cover using either a key or keypad.

In the foregoing discussion, the present embodiments have been described with reference to specific exemplary aspects thereof. But the present invention is not confined to the configuration listed in the foregoing embodiments; the person skilled in the art can modify such configurations into various other embodiments without departing from the spirit and scope of the invention. Accordingly, the foregoing discussion and the accompanying drawings are to be regarded as merely illustrative of the present invention rather than as limiting its scope in any manner.

What is claimed is:

1. A system for speaker arm deployment from a vehicle as a base, the system comprising:
    a housing configured to be held during transport in the vehicle;
    a movable lid attached to the housing;
    one or more speaker arms attached to the housing and configured: (i) to be enclosed within the housing when the lid is closed, and (ii) to mechanically deploy to a position outside of the housing by moving out of the housing when the lid is open, wherein the one or more speaker arms include one or more speakers mounted on or embedded within the one or more speaker arms; and
    a processor configured to automatically control: (i) the lid to open, and (ii) the one or more speaker arms to mechanically deploy vertically.

2. The system of claim 1, wherein the processor is further configured to control the lid to close after the arms are fully deployed while the arms are fully deployed.

3. The system of claim 1, wherein
    the one or more speaker arms include two arms; and
    the processor is further configured to simultaneously control the two or more speaker arms to mechanically deploy to respective positions outside of the housing.

4. The system of claim 1, wherein the processor is further configured to:
    receive a predetermined user input; and
    automatically: (i) open the lid, and (ii) mechanically deploy the one or more arms, when the predetermined user input is received.

5. The system of claim 1, further comprising a display wherein the processor is further configured to control the display to move from a stored position within the housing to a deployed position outside of the housing.

6. The system of claim 1, further comprising one or more movable stabilizer plates, wherein the processor is configured to control the stabilizer plates to extend from the housing so as to apply pressure to inner walls of a truck bed of the vehicle to stabilize the housing within the vehicle such that the housing could can be transported in the vehicle.

7. The system of claim 1, wherein the housing is made of a material having a weight sufficient to prevent the system from shifting or vibrating from audio playback/reverb when the speakers are operating.

8. The system of claim 1, wherein
the housing includes separate front and rear compartments; and
the motorized speaker arms are located in the rear compartment.

9. The system of claim 1, wherein the speakers are mounted to the arms via swivel mounting mechanisms.

10. The system of claim 1, further comprising: a microphone coupled to the one or more speakers, wherein the one or more speakers are configured to provide playback of audio received by the microphone.

11. The system of claim 1, wherein the processor is configured to control the deployment of the speaker arms in two stages, the two stages including a first stage of deployment where the speaker arms move vertically, and a second stage of deployment where the speaker arms rotate upward and outward.

12. An enclosure for deployment of audio and/or visual components from a vehicle as a base, comprising:
a housing configured to be held during transport in the vehicle;
a movable lid attached to the housing;
one or more speaker arms attached to the housing and configured: (i) to be enclosed within the housing when the lid is closed, and (ii) to mechanically deploy to a position outside of the housing by moving out of the housing when the lid is open, wherein the one or more speaker arms include one or more speakers mounted on or embedded within the one or more speaker arms;
means for securing the housing to the vehicle; and
means for stabilizing the housing with the vehicle.

13. The enclosure of claim 12, wherein the vehicle is a truck; and the housing provides two horizontal protruding portions on opposite left and rear sides of the housing such that the housing is configured to clear a wheel well in a bed of the vehicle.

14. The enclosure of claim 12, wherein the arms are either: (A) curved in a shape as to mimic the contour of a top of the vehicle when the arms are in a fully deployed state, or (B) vertically shaped.

15. The enclosure of claim 12, further comprising a separate compartment configured to house a television or computer monitor.

16. The system of claim 1, wherein
the one or more speaker arms include two speaker arms,
the longest axis lengthwise of each of the speaker arms is the same along a horizontal plane, when the speaker arms are enclosed within the housing, and
at least a portion of an axis of the speaker arms are parallel vertically, when the speaker arms are deployed.

17. The system of claim 1, wherein the one or more speaker arms are hollow, and provide one or more pathways for one or more speaker cables connected to the one or more speakers.

18. The system of claim 1, further comprising a deployment/retraction mechanism comprising one or more cam rollers mounted in a bracket assembly.

19. The system of claim 1, wherein the one or more speakers are mounted to the one or more speaker arms by swivels such that the speakers may be adjusted to change facing directions.

20. The system of claim 1, wherein
the deployment of the one or more speaker arms includes travelling vertically via cam rollers such that the deployment of the one or more speaker arms starts moving upward in a vertical direction until top cam rollers reach a point where a front bracket guide and a rear bracket guide enter a predefined channel turn outwards, and
the deployment is such that the mounting arms have a wider outside wing span dimension, after full deployment, than the width of the housing in the same direction.

* * * * *